United States Patent
Proctor, Jr.

(10) Patent No.: US 9,247,510 B2
(45) Date of Patent: *Jan. 26, 2016

(54) USE OF CORRELATION COMBINATION TO ACHIEVE CHANNEL DETECTION

(71) Applicant: Intel Corporation, Santa Clara, CA (US)

(72) Inventor: James A. Proctor, Jr., Melbourne Beach, FL (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/137,099

(22) Filed: Dec. 20, 2013

(65) Prior Publication Data

US 2014/0177608 A1    Jun. 26, 2014

Related U.S. Application Data

(63) Continuation of application No. 13/306,547, filed on Nov. 29, 2011, now Pat. No. 8,638,877, which is a continuation of application No. 12/488,798, filed on Jun. 22, 2009, now abandoned, which is a continuation (Continued)

(51) Int. Cl.
*H04B 1/69*    (2011.01)
*H04W 56/00*    (2009.01)
(Continued)

(52) U.S. Cl.
CPC ............... *H04W 56/00* (2013.01); *H04B 1/709* (2013.01); *H04B 7/2681* (2013.01); *H04W 56/0085* (2013.01)

(58) Field of Classification Search
CPC ............. H04B 7/2681; H04B 1/70735; H04B 1/70751; H04B 1/7077; H04B 2001/70706; H04B 7/2668; H04W 56/0085; H04W 72/0433; H04W 92/20

USPC ......... 375/219, 295, 316, 340, 354, 358, 343, 375/130, 140, 142, 147, 150, 335, 342, 375/441; 370/503

See application file for complete search history.

(56) References Cited

U.S. PATENT DOCUMENTS

| | | |
|---|---|---|
| 3,560,978 A | 2/1971 | Himmel et al. |
| 3,725,938 A | 4/1973 | Black et al. |

(Continued)

FOREIGN PATENT DOCUMENTS

| | | |
|---|---|---|
| DE | 2812575 | 9/1979 |
| EP | 0 443 061 | 8/1991 |

(Continued)

OTHER PUBLICATIONS

Notice of Allowance for U.S. Appl. No. 13/306,547 mailed Sep. 16, 2013, 6 pages.

(Continued)

*Primary Examiner* — Tesfaldet Bocure
(74) *Attorney, Agent, or Firm* — Blakely, Sokoloff, Taylor & Zafman LLP

(57) ABSTRACT

Wireless mobile devices are disclosed. A receiver to receive a coded signal having a code applied to the received coded signal includes a lower rate code comprising at least two code sequences of a higher rate code. One or more correlators are coupled with the receiver to correlate the received coded signal with the higher rate code to provide a higher rate code correlation result, to correlate the higher rate code correlation results with a first lower rate code to provide a first lower rate code correlation result, and to correlate the higher rate code correlation results with a second lower rate code to provide a second lower rate code correlation result. A comparator is coupled with the one or more correlators to compare the first lower rate code correlation result to the second lower rate code correlation result to determine presence of a signal indication.

19 Claims, 6 Drawing Sheets

Related U.S. Application Data of application No. 10/119,522, filed on Apr. 9, 2002, now Pat. No. 7,551,663, which is a continuation-in-part of application No. 09/775,305, filed on Feb. 1, 2001, now Pat. No. 7,079,523.

(60) Provisional application No. 60/282,936, filed on Apr. 10, 2001.

(51) Int. Cl.
   *H04B 1/709*   (2011.01)
   *H04B 7/26*    (2006.01)

(56) References Cited

U.S. PATENT DOCUMENTS

| | | |
|---|---|---|
| 3,742,498 A | 6/1973 | Dunn |
| 3,846,799 A | 11/1974 | Guegen |
| 3,950,753 A | 4/1976 | Chisholm |
| 4,021,813 A | 5/1977 | Black et al. |
| 4,099,184 A | 7/1978 | Rapshys |
| 4,107,469 A | 8/1978 | Jenkins |
| 4,170,766 A | 10/1979 | Pridham et al. |
| 4,260,994 A | 4/1981 | Parker |
| 4,290,071 A | 9/1981 | Fenwick |
| 4,387,378 A | 6/1983 | Henderson |
| 4,488,155 A | 12/1984 | Wu |
| 4,577,316 A | 3/1986 | Schiff |
| 4,599,733 A | 7/1986 | Gutleber |
| 4,625,308 A | 11/1986 | Kim et al. |
| 4,631,546 A | 12/1986 | Dumas et al. |
| 4,642,806 A | 2/1987 | Hewitt et al. |
| 4,675,863 A | 6/1987 | Paneth et al. |
| 4,700,197 A | 10/1987 | Milne |
| 4,817,089 A | 3/1989 | Paneth et al. |
| 4,841,526 A | 6/1989 | Wilson et al. |
| 4,862,453 A | 8/1989 | West et al. |
| 4,866,709 A | 9/1989 | West et al. |
| 4,887,266 A | 12/1989 | Neve et al. |
| 4,901,307 A | 2/1990 | Gilhousen et al. |
| 4,912,705 A | 3/1990 | Paneth et al. |
| 4,949,395 A | 8/1990 | Rydbeck |
| 4,954,950 A | 9/1990 | Freeman et al. |
| 5,022,024 A | 6/1991 | Paneth et al. |
| 5,027,125 A | 6/1991 | Tang |
| 5,027,348 A | 6/1991 | Curry |
| 5,027,400 A | 6/1991 | Baji et al. |
| 5,038,149 A | 8/1991 | Aubry et al. |
| 5,056,109 A | 10/1991 | Gilhousen et al. |
| 5,068,916 A | 11/1991 | Harrison et al. |
| 5,101,416 A | 3/1992 | Fenton et al. |
| 5,103,459 A | 4/1992 | Gilhousen et al. |
| 5,114,375 A | 5/1992 | Wellhausen et al. |
| 5,115,309 A | 5/1992 | Hang |
| 5,117,236 A | 5/1992 | Chang et al. |
| 5,124,981 A | 6/1992 | Golding |
| 5,130,983 A | 7/1992 | Heffner, III |
| 5,166,929 A | 11/1992 | Lo |
| 5,226,044 A | 7/1993 | Gupta et al. |
| 5,235,343 A | 8/1993 | Audren et al. |
| 5,257,283 A | 10/1993 | Gilhousen et al. |
| 5,267,262 A | 11/1993 | Wheatley, III |
| 5,268,900 A | 12/1993 | Hluchyj et al. |
| 5,280,472 A | 1/1994 | Gilhousen et al. |
| 5,282,222 A | 1/1994 | Fattouche et al. |
| 5,293,172 A | 3/1994 | Lamberty et al. |
| 5,294,939 A | 3/1994 | Sanford et al. |
| 5,303,240 A | 4/1994 | Borras et al. |
| 5,325,394 A | 6/1994 | Bruckert |
| 5,325,419 A | 6/1994 | Connolly et al. |
| 5,337,316 A | 8/1994 | Weiss et al. |
| 5,339,316 A | 8/1994 | Diepstraten |
| 5,353,332 A | 10/1994 | Raith et al. |
| 5,355,374 A | 10/1994 | Hester et al. |
| 5,373,502 A | 12/1994 | Turban |
| 5,375,124 A | 12/1994 | D'Ambrogio et al. |
| 5,377,192 A | 12/1994 | Goodings et al. |
| 5,388,102 A | 2/1995 | Griffith et al. |
| 5,394,473 A | 2/1995 | Davidson |
| 5,412,429 A | 5/1995 | Glover |
| 5,414,728 A | 5/1995 | Zehavi |
| 5,422,887 A | 6/1995 | Diepstraten et al. |
| 5,430,452 A | 7/1995 | DuBois |
| 5,437,055 A | 7/1995 | Wheatley, III |
| 5,442,625 A | 8/1995 | Gitlin et al. |
| 5,446,727 A | 8/1995 | Bruckert et al. |
| 5,463,629 A | 10/1995 | Ko |
| 5,471,463 A | 11/1995 | Hulbert |
| 5,479,176 A | 12/1995 | Zavrel, Jr. |
| 5,481,533 A | 1/1996 | Honig et al. |
| 5,487,180 A | 1/1996 | Ohtake |
| 5,490,136 A | 2/1996 | Sereno et al. |
| 5,493,569 A | 2/1996 | Buchholz et al. |
| 5,502,447 A | 3/1996 | Kumpfbeck et al. |
| 5,511,068 A | 4/1996 | Sato |
| 5,537,397 A | 7/1996 | Abramson |
| 5,537,414 A | 7/1996 | Takiyasu et al. |
| 5,550,828 A | 8/1996 | Gries et al. |
| 5,559,789 A | 9/1996 | Nakano et al. |
| 5,577,022 A | 11/1996 | Padovani et al. |
| 5,581,575 A | 12/1996 | Zehavi et al. |
| 5,585,850 A | 12/1996 | Schwaller |
| 5,586,119 A | 12/1996 | Scribano et al. |
| 5,590,409 A | 12/1996 | Sawahashi et al. |
| 5,592,178 A | 1/1997 | Chang et al. |
| 5,592,468 A | 1/1997 | Sato |
| 5,592,470 A | 1/1997 | Rudrapatna et al. |
| 5,592,471 A | 1/1997 | Briskman |
| 5,598,416 A | 1/1997 | Yamada et al. |
| 5,598,417 A | 1/1997 | Crisler et al. |
| 5,604,730 A | 2/1997 | Tiedemann, Jr. |
| 5,606,580 A | 2/1997 | Mourot et al. |
| 5,617,102 A | 4/1997 | Prater |
| 5,617,423 A | 4/1997 | Li et al. |
| 5,619,492 A | 4/1997 | Press et al. |
| 5,619,524 A | 4/1997 | Ling et al. |
| 5,621,752 A | 4/1997 | Antonio et al. |
| 5,634,199 A | 5/1997 | Gerlach et al. |
| 5,642,348 A | 6/1997 | Barzegar et al. |
| 5,642,377 A | 6/1997 | Chung et al. |
| 5,652,764 A | 7/1997 | Kanzaki et al. |
| 5,655,001 A | 8/1997 | Cline et al. |
| 5,657,326 A | 8/1997 | Burns et al. |
| 5,657,358 A | 8/1997 | Panech et al. |
| 5,663,958 A | 9/1997 | Ward |
| 5,663,990 A | 9/1997 | Bolgiano et al. |
| 5,673,259 A | 9/1997 | Quick, Jr. |
| 5,680,142 A | 10/1997 | Smith et al. |
| 5,684,794 A | 11/1997 | Lopez et al. |
| 5,687,194 A | 11/1997 | Paneth et al. |
| 5,689,502 A | 11/1997 | Scott |
| 5,697,059 A | 12/1997 | Carney |
| 5,699,364 A | 12/1997 | Sato et al. |
| 5,708,656 A | 1/1998 | Noneman et al. |
| 5,712,869 A | 1/1998 | Lee et al. |
| 5,715,236 A | 2/1998 | Gilhousen et al. |
| 5,726,981 A | 3/1998 | Ylitervo et al. |
| 5,734,646 A | 3/1998 | I et al. |
| 5,739,784 A | 4/1998 | Jan et al. |
| 5,742,592 A | 4/1998 | Scholefield et al. |
| 5,745,484 A | 4/1998 | Scott |
| 5,758,288 A | 5/1998 | Dunn et al. |
| 5,764,648 A | 6/1998 | Yamane et al. |
| 5,767,807 A | 6/1998 | Pritchett |
| 5,781,542 A | 7/1998 | Tanaka et al. |
| 5,781,543 A | 7/1998 | Ault et al. |
| 5,784,406 A | 7/1998 | DeJaco et al. |
| 5,790,549 A | 8/1998 | Dent |
| 5,790,551 A | 8/1998 | Chan |
| 5,793,744 A | 8/1998 | Kanerva et al. |
| 5,802,046 A | 9/1998 | Scott |
| 5,802,465 A | 9/1998 | Hamalainen et al. |
| 5,805,994 A | 9/1998 | Perreault et al. |
| 5,812,131 A | 9/1998 | Bertram |

(56) References Cited

U.S. PATENT DOCUMENTS

| | | |
|---|---|---|
| 5,825,807 A | 10/1998 | Kumar |
| 5,828,659 A | 10/1998 | Teder et al. |
| 5,828,662 A | 10/1998 | Jalali et al. |
| 5,838,720 A | 11/1998 | Morelli |
| 5,841,768 A | 11/1998 | Ozluturk et al. |
| 5,844,894 A | 12/1998 | Dent |
| 5,845,211 A | 12/1998 | Roach |
| 5,854,786 A | 12/1998 | Henderson et al. |
| 5,856,971 A | 1/1999 | Gitlin et al. |
| 5,859,840 A | 1/1999 | Tiedemann, Jr. et al. |
| 5,859,879 A | 1/1999 | Bolgiano et al. |
| 5,862,476 A | 1/1999 | Hasegawa |
| 5,867,527 A | 2/1999 | Ziv et al. |
| 5,872,786 A | 2/1999 | Shobatake |
| 5,873,043 A | 2/1999 | Comer |
| 5,875,182 A | 2/1999 | Hatzipapafotiou |
| 5,881,060 A | 3/1999 | Morrow et al. |
| 5,881,368 A | 3/1999 | Grob et al. |
| 5,884,196 A | 3/1999 | Lekven et al. |
| 5,892,774 A | 4/1999 | Zehavi et al. |
| 5,892,793 A | 4/1999 | Gibson |
| 5,893,035 A | 4/1999 | Chen |
| 5,894,473 A | 4/1999 | Dent |
| 5,896,374 A | 4/1999 | Okumura et al. |
| 5,896,376 A | 4/1999 | Alperovich et al. |
| 5,898,929 A | 4/1999 | Haartsen |
| 5,903,834 A | 5/1999 | Wallstedt et al. |
| 5,905,473 A | 5/1999 | Taenzer |
| 5,910,944 A | 6/1999 | Callicotte et al. |
| 5,910,945 A | 6/1999 | Garrison et al. |
| 5,914,950 A | 6/1999 | Tiedemann, Jr. et al. |
| 5,915,216 A | 6/1999 | Lysejko |
| 5,918,157 A | 6/1999 | Wiedeman et al. |
| 5,918,170 A | 6/1999 | Oksanen et al. |
| 5,923,650 A | 7/1999 | Chen et al. |
| 5,926,500 A | 7/1999 | Odenwalder |
| 5,930,230 A | 7/1999 | Odenwalder et al. |
| 5,933,781 A | 8/1999 | Willenegger et al. |
| 5,943,362 A | 8/1999 | Saito |
| 5,946,356 A | 8/1999 | Felix et al. |
| 5,949,814 A | 9/1999 | Odenwalder et al. |
| 5,950,131 A | 9/1999 | Vilmur |
| 5,956,332 A | 9/1999 | Rasanen et al. |
| 5,959,980 A | 9/1999 | Scott |
| 5,960,361 A | 9/1999 | Chen |
| 5,963,559 A | 10/1999 | Ohki |
| 5,966,374 A | 10/1999 | Rasanen |
| 5,974,036 A | 10/1999 | Acharya et al. |
| 5,982,760 A | 11/1999 | Chen |
| 5,990,806 A | 11/1999 | Mock et al. |
| 5,991,279 A | 11/1999 | Haugli et al. |
| 5,991,284 A | 11/1999 | Willenegger et al. |
| 5,991,618 A | 11/1999 | Hall |
| 6,001,800 A | 12/1999 | Mehta et al. |
| 6,002,690 A | 12/1999 | Takayama et al. |
| 6,005,852 A | 12/1999 | Kokko et al. |
| 6,005,855 A | 12/1999 | Zehavi et al. |
| 6,009,106 A | 12/1999 | Rustad et al. |
| 6,011,800 A | 1/2000 | Nadgauda et al. |
| 6,016,312 A | 1/2000 | Storn et al. |
| 6,028,868 A | 2/2000 | Yeung et al. |
| 6,031,827 A | 2/2000 | Rikkinen et al. |
| 6,031,832 A | 2/2000 | Turina |
| 6,034,638 A | 3/2000 | Thiel et al. |
| 6,037,905 A | 3/2000 | Koscica et al. |
| 6,038,450 A | 3/2000 | Brink et al. |
| 6,049,535 A | 4/2000 | Ozluturk |
| 6,049,538 A | 4/2000 | Scott |
| 6,052,385 A | 4/2000 | Kanerva et al. |
| 6,058,338 A | 5/2000 | Agashe et al. |
| 6,064,678 A | 5/2000 | Sindhushayana et al. |
| 6,069,880 A | 5/2000 | Owen et al. |
| 6,069,883 A | 5/2000 | Ejzak et al. |
| 6,070,071 A | 5/2000 | Chavez et al. |
| 6,075,974 A | 6/2000 | Saints et al. |
| 6,078,572 A | 6/2000 | Tanno et al. |
| 6,081,536 A | 6/2000 | Gorsuch et al. |
| 6,088,324 A | 7/2000 | Sato |
| 6,088,335 A | 7/2000 | I et al. |
| 6,094,421 A | 7/2000 | Scott |
| 6,094,576 A | 7/2000 | Hakkinen et al. |
| 6,097,707 A | 8/2000 | Hodzic et al. |
| 6,097,733 A | 8/2000 | Basu et al. |
| 6,097,972 A | 8/2000 | Saints et al. |
| 6,100,843 A | 8/2000 | Proctor, Jr. et al. |
| 6,101,176 A | 8/2000 | Honkasalo et al. |
| 6,101,179 A | 8/2000 | Soliman |
| 6,104,708 A | 8/2000 | Bergamo |
| 6,111,863 A | 8/2000 | Rostoker et al. |
| 6,112,092 A | 8/2000 | Benveniste |
| 6,115,370 A | 9/2000 | Struhsaker et al. |
| 6,118,767 A | 9/2000 | Shen et al. |
| 6,125,148 A | 9/2000 | Frodigh et al. |
| 6,134,233 A | 10/2000 | Kay |
| 6,151,332 A | 11/2000 | Gorsuch et al. |
| 6,157,616 A | 12/2000 | Whitehead |
| 6,157,619 A | 12/2000 | Ozluturk et al. |
| 6,161,013 A | 12/2000 | Anderson et al. |
| 6,163,707 A | 12/2000 | Miller |
| 6,169,731 B1 | 1/2001 | Stewart et al. |
| 6,169,759 B1 | 1/2001 | Kanterakis et al. |
| 6,185,184 B1 | 2/2001 | Mattaway et al. |
| 6,185,266 B1 | 2/2001 | Kuchi et al. |
| 6,188,678 B1 | 2/2001 | Prescott |
| 6,188,903 B1 | 2/2001 | Gardner et al. |
| 6,195,362 B1 | 2/2001 | Darcie et al. |
| 6,198,723 B1 | 3/2001 | Parruck et al. |
| 6,201,966 B1 | 3/2001 | Rinne et al. |
| 6,208,871 B1 | 3/2001 | Hall et al. |
| 6,212,175 B1 | 4/2001 | Harsch |
| 6,212,220 B1 | 4/2001 | Proctor, Jr. |
| 6,214,342 B1 | 4/2001 | Alberici et al. |
| 6,215,798 B1 | 4/2001 | Carneheim et al. |
| 6,219,342 B1 | 4/2001 | Rege |
| 6,222,828 B1 | 4/2001 | Ohlson et al. |
| 6,222,832 B1 | 4/2001 | Proctor |
| 6,222,873 B1 | 4/2001 | Bang et al. |
| 6,226,279 B1 | 5/2001 | Hansson et al. |
| 6,226,527 B1 | 5/2001 | Dalsgaard et al. |
| 6,233,439 B1 | 5/2001 | Jalali |
| 6,236,646 B1 | 5/2001 | Beming et al. |
| 6,236,647 B1 | 5/2001 | Amalfitano |
| 6,236,674 B1 | 5/2001 | Morelli et al. |
| 6,243,372 B1 | 6/2001 | Petch et al. |
| 6,246,673 B1 | 6/2001 | Tiedemann, Jr. et al. |
| 6,246,715 B1 | 6/2001 | Park et al. |
| RE37,301 E | 7/2001 | Lo |
| 6,256,509 B1 | 7/2001 | Tanaka et al. |
| 6,259,683 B1 | 7/2001 | Sekine et al. |
| 6,262,980 B1 | 7/2001 | Leung et al. |
| 6,263,013 B1 | 7/2001 | Hendrickson |
| 6,269,075 B1 | 7/2001 | Tran |
| 6,269,088 B1 | 7/2001 | Masui et al. |
| 6,272,168 B1 | 8/2001 | Lomp et al. |
| 6,272,354 B1 | 8/2001 | Saario |
| 6,275,478 B1 | 8/2001 | Tiedemann, Jr. |
| 6,278,701 B1 | 8/2001 | Ayyagari et al. |
| 6,285,665 B1 | 9/2001 | Chuah |
| 6,292,474 B1 | 9/2001 | Ali et al. |
| 6,301,286 B1 | 10/2001 | Kanterakis et al. |
| 6,301,291 B1 | 10/2001 | Rouphael et al. |
| 6,304,215 B1 | 10/2001 | Proctor, Jr. et al. |
| 6,307,840 B1 | 10/2001 | Wheatley, III et al. |
| 6,310,859 B1 | 10/2001 | Morita et al. |
| 6,314,300 B1 | 11/2001 | Nakashima et al. |
| 6,317,092 B1 | 11/2001 | De Schweinitz et al. |
| 6,320,851 B1 | 11/2001 | Kim et al. |
| 6,332,008 B1 | 12/2001 | Giallorenzi et al. |
| 6,337,668 B1 | 1/2002 | Ito et al. |
| 6,339,612 B1 | 1/2002 | Stewart et al. |
| 6,353,412 B1 | 3/2002 | Soliman |
| 6,353,645 B1 | 3/2002 | Solve et al. |
| 6,356,538 B1 | 3/2002 | Li |
| 6,356,555 B1 | 3/2002 | Rakib |

(56) References Cited

U.S. PATENT DOCUMENTS

| | | |
|---|---|---|
| 6,366,570 B1 | 4/2002 | Bhagalia |
| 6,366,786 B1 | 4/2002 | Norman et al. |
| 6,370,117 B1 | 4/2002 | Koraitim et al. |
| 6,373,830 B1 | 4/2002 | Ozluturk |
| 6,373,834 B1 | 4/2002 | Lundh et al. |
| 6,377,548 B1 | 4/2002 | Chuah |
| 6,377,809 B1 | 4/2002 | Rezaiifar et al. |
| 6,388,997 B1 | 5/2002 | Scott |
| 6,388,999 B1 | 5/2002 | Gorsuch et al. |
| 6,389,000 B1 | 5/2002 | Jou |
| 6,396,804 B2 | 5/2002 | Odenwalder |
| 6,396,823 B1 | 5/2002 | Park et al. |
| 6,414,947 B1 | 7/2002 | Legg et al. |
| 6,418,148 B1 | 7/2002 | Kumar et al. |
| 6,424,645 B1 | 7/2002 | Kawabata et al. |
| 6,426,960 B2 | 7/2002 | Antonio |
| 6,452,911 B1 | 9/2002 | Seo |
| 6,452,913 B1 | 9/2002 | Proctor, Jr. |
| 6,453,176 B1 | 9/2002 | Lopes et al. |
| 6,456,608 B1 | 9/2002 | Lomp |
| 6,466,800 B1 | 10/2002 | Sydon et al. |
| 6,469,991 B1 | 10/2002 | Chuah |
| 6,473,623 B1 | 10/2002 | Benveniste |
| 6,483,816 B2 | 11/2002 | Tsunehara et al. |
| 6,490,461 B1 | 12/2002 | Muller |
| 6,498,785 B1 | 12/2002 | Derryberry et al. |
| 6,498,790 B1 | 12/2002 | Shaheen et al. |
| 6,498,939 B1 | 12/2002 | Thomas |
| 6,501,787 B1 | 12/2002 | Odenwalder et al. |
| 6,504,830 B1 | 1/2003 | Östberg et al. |
| 6,512,751 B1 | 1/2003 | Struhsaker et al. |
| 6,512,931 B1 | 1/2003 | Kim et al. |
| 6,519,452 B1 | 2/2003 | Agostino et al. |
| 6,519,651 B1 | 2/2003 | Dillon |
| 6,522,639 B1 | 2/2003 | Kitade et al. |
| 6,526,039 B1 | 2/2003 | Dahlman et al. |
| 6,526,064 B1 | 2/2003 | Bousquet |
| 6,526,281 B1 | 2/2003 | Gorsuch et al. |
| 6,532,225 B1 | 3/2003 | Chang et al. |
| 6,532,226 B1 | 3/2003 | Lehtinent et al. |
| 6,532,365 B1 | 3/2003 | Anderson et al. |
| 6,535,545 B1 | 3/2003 | Ben-Bassat et al. |
| 6,535,547 B1 | 3/2003 | Lyckegard et al. |
| 6,542,481 B2 | 4/2003 | Foore et al. |
| 6,545,986 B1 | 4/2003 | Stellakis |
| 6,545,994 B2 | 4/2003 | Nelson, Jr. et al. |
| 6,546,252 B1 | 4/2003 | Jetzek et al. |
| 6,563,808 B1 | 5/2003 | Cox et al. |
| 6,567,389 B1 | 5/2003 | Honkasalo et al. |
| 6,567,391 B1 | 5/2003 | Moon |
| 6,567,416 B1 | 5/2003 | Chuah |
| 6,567,670 B1 | 5/2003 | Petersson |
| 6,570,865 B2 | 5/2003 | Masui et al. |
| 6,571,296 B1 | 5/2003 | Dillon |
| 6,574,211 B2 | 6/2003 | Padovani et al. |
| 6,587,446 B2 | 7/2003 | Sarkar et al. |
| 6,597,913 B2 | 7/2003 | Natarajan |
| 6,611,231 B2 | 8/2003 | Crilly et al. |
| 6,611,514 B1 | 8/2003 | Moulsley |
| 6,621,807 B1 | 9/2003 | Jung et al. |
| 6,621,808 B1 | 9/2003 | Sadri |
| 6,621,809 B1 | 9/2003 | Lee et al. |
| 6,628,945 B1 | 9/2003 | Koorapaty et al. |
| 6,633,554 B1 | 10/2003 | Dalal |
| 6,647,000 B1 | 11/2003 | Persson et al. |
| 6,674,739 B1 | 1/2004 | Lee et al. |
| 6,687,509 B2 | 2/2004 | Schmutz et al. |
| 6,690,652 B1 | 2/2004 | Sadri |
| 6,690,938 B1 | 2/2004 | Chin |
| 6,697,642 B1 | 2/2004 | Thomas |
| 6,707,804 B2 | 3/2004 | Proctor, Jr. |
| 6,707,806 B1 | 3/2004 | Kato |
| 6,717,916 B1 | 4/2004 | Ahn et al. |
| 6,718,180 B1 | 4/2004 | Lundh et al. |
| 6,724,740 B1 | 4/2004 | Choi et al. |
| 6,724,743 B1 | 4/2004 | Pigeonnat |
| 6,731,614 B1 | 5/2004 | Ohlson et al. |
| 6,731,954 B1 | 5/2004 | Katz |
| 6,735,188 B1 | 5/2004 | Becker et al. |
| 6,760,596 B1 | 7/2004 | Fiorini et al. |
| 6,768,727 B1 | 7/2004 | Sourour et al. |
| 6,775,558 B1 | 8/2004 | Ranta et al. |
| 6,782,277 B1 | 8/2004 | Chen et al. |
| 6,785,247 B1 | 8/2004 | Lee |
| 6,788,661 B1 | 9/2004 | Ylitalo et al. |
| 6,795,416 B1 | 9/2004 | Han et al. |
| 6,804,219 B2 | 10/2004 | Koo et al. |
| 6,807,160 B1 | 10/2004 | Laroia et al. |
| 6,807,221 B1 | 10/2004 | Kim et al. |
| 6,826,169 B1 | 11/2004 | Nagatani et al. |
| 6,831,910 B1 | 12/2004 | Moon et al. |
| 6,842,482 B1 | 1/2005 | Hiramatsu |
| 6,845,089 B1 | 1/2005 | Gu et al. |
| 6,868,075 B1 | 3/2005 | Narvinger et al. |
| 6,904,279 B1 * | 6/2005 | Lilja et al. .................. 455/426.2 |
| 6,925,057 B2 | 8/2005 | Cheng et al. |
| 6,925,068 B1 | 8/2005 | Stanwood et al. |
| 6,931,252 B1 | 8/2005 | Aroudaki |
| 6,934,319 B2 | 8/2005 | Subramanian |
| 6,940,845 B2 | 9/2005 | Benveniste |
| 6,954,444 B2 | 10/2005 | Ji et al. |
| 6,956,840 B1 | 10/2005 | Proctor, Jr. |
| 6,963,540 B2 | 11/2005 | Choi et al. |
| 6,977,910 B1 | 12/2005 | Hosur et al. |
| 6,999,425 B2 | 2/2006 | Cheng et al. |
| 6,999,471 B1 | 2/2006 | Frazer et al. |
| 7,027,420 B2 | 4/2006 | Hamalainen |
| 7,039,029 B2 | 5/2006 | Lee et al. |
| 7,046,717 B2 | 5/2006 | Kanterakis et al. |
| 7,079,507 B2 | 7/2006 | Toskala et al. |
| 7,079,523 B2 | 7/2006 | Nelson, Jr. et al. |
| 7,099,629 B1 | 8/2006 | Bender |
| 7,136,377 B1 | 11/2006 | Tweedly et al. |
| 7,158,504 B2 | 1/2007 | Kadaba et al. |
| 7,218,623 B1 | 5/2007 | Proctor, Jr. |
| 7,221,664 B2 | 5/2007 | Proctor, Jr. |
| 7,224,683 B1 | 5/2007 | Marque-Pucheu et al. |
| 7,236,467 B2 | 6/2007 | Kono |
| 7,239,621 B2 * | 7/2007 | Eriksson ........................ 370/335 |
| 7,266,107 B2 | 9/2007 | Choi et al. |
| 7,340,256 B2 | 3/2008 | Speight |
| 2001/0030990 A1 | 10/2001 | Rouphael et al. |
| 2001/0033558 A1 | 10/2001 | Matsuki |
| 2001/0036200 A1 | 11/2001 | Nelson et al. |
| 2001/0038674 A1 | 11/2001 | Trans |
| 2001/0039191 A1 | 11/2001 | Maierhofer |
| 2002/0009061 A1 | 1/2002 | Willenegger |
| 2002/0012332 A1 | 1/2002 | Tiedmann et al. |
| 2002/0045441 A1 | 4/2002 | Ralston et al. |
| 2002/0068567 A1 * | 6/2002 | Johansson ..................... 455/436 |
| 2002/0080024 A1 | 6/2002 | Nelson et al. |
| 2002/0097700 A1 | 7/2002 | Alastalo et al. |
| 2002/0141478 A1 | 10/2002 | Ozluturk et al. |
| 2003/0060224 A1 | 3/2003 | Nelson et al. |
| 2003/0095517 A1 | 5/2003 | Proctor, Jr. |
| 2003/0123401 A1 | 7/2003 | Dean |
| 2004/0005078 A1 | 1/2004 | Tillotson |
| 2004/0009785 A1 | 1/2004 | Nelson et al. |
| 2004/0047328 A1 | 3/2004 | Proctor et al. |
| 2004/0073803 A1 | 4/2004 | Keramane |
| 2004/0160910 A1 | 8/2004 | Gorsuch et al. |
| 2004/0180696 A1 | 9/2004 | Foore et al. |
| 2005/0202823 A1 | 9/2005 | Shaheen et al. |
| 2005/0208961 A1 | 9/2005 | Willenegger |
| 2008/0225766 A1 | 9/2008 | Roy et al. |

FOREIGN PATENT DOCUMENTS

| | | |
|---|---|---|
| EP | 0 526 106 | 2/1993 |
| EP | 0 682 423 | 11/1995 |
| EP | 0 682 426 | 11/1995 |
| EP | 0 719 062 | 6/1996 |
| EP | 0 720 309 | 7/1996 |
| EP | 0 475 698 | 3/1997 |

(56) References Cited

FOREIGN PATENT DOCUMENTS

| | | |
|---|---|---|
| EP | 0 760 564 | 3/1997 |
| EP | 0 773 636 | 5/1997 |
| EP | 0 808 074 | 11/1997 |
| EP | 0 907 262 | 4/1999 |
| EP | 0 910 176 | 4/1999 |
| EP | 0 959 851 | 11/1999 |
| EP | 1 018 809 | 12/2000 |
| EP | 1 102 512 | 5/2001 |
| GB | 2 326 564 | 12/1998 |
| JP | 59-050603 | 3/1984 |
| JP | 02-177643 | 7/1990 |
| JP | 03-049324 | 3/1991 |
| JP | 04-284033 | 10/1992 |
| JP | 05-030006 | 2/1993 |
| JP | 07-067164 | 3/1995 |
| JP | 07-095151 | 4/1995 |
| JP | 07-131398 | 10/1995 |
| JP | 07-264098 | 10/1995 |
| JP | 08-065273 | 3/1996 |
| JP | 08-242482 | 9/1996 |
| JP | 09-023203 | 1/1997 |
| JP | 09-046270 | 2/1997 |
| JP | 09-055693 | 2/1997 |
| JP | 2000-013867 | 1/2000 |
| JP | 2000-188597 | 7/2000 |
| TW | 566045 | 12/2003 |
| TW | 200536325 | 11/2005 |
| WO | 93/15573 | 8/1993 |
| WO | 95/08900 | 3/1995 |
| WO | 96/08934 | 3/1996 |
| WO | 96/19050 | 6/1996 |
| WO | 96/37081 | 11/1996 |
| WO | 96/27994 | 12/1996 |
| WO | 97/46041 | 4/1997 |
| WO | 97/23073 | 6/1997 |
| WO | 97/26726 | 7/1997 |
| WO | 97/32412 | 9/1997 |
| WO | 97/46044 | 12/1997 |
| WO | 98/09455 | 3/1998 |
| WO | 99/14869 | 3/1999 |
| WO | 99/25125 | 5/1999 |
| WO | 99/31811 | 6/1999 |
| WO | 99/49596 | 9/1999 |
| WO | 99/52306 | 10/1999 |
| WO | 99/63682 | 12/1999 |
| WO | 00/57663 | 9/2000 |
| WO | 00/62449 | 10/2000 |
| WO | 00/72464 | 11/2000 |

OTHER PUBLICATIONS

Non-Final Office Action for U.S. Appl. No. 09/775,305 mailed Jul. 13, 2004, 6 pages.
Non-Final Office Action for U.S. Appl. No. 09/775,305 mailed Apr. 1, 2005, 9 pages.
Final Office Action for U.S. Appl. No. 09/775,305 mailed Oct. 4, 2005, 10 pages.
Notice of Allowance for U.S. Appl. No. 09/775,305 mailed Feb. 28, 2006, 6 pages.
Ex Parte Quayle Action for U.S. Appl. No. 13/306,547 mailed Jun. 4, 2013, 7 pages.
Non-Final Office Action for U.S. Appl. No. 12/488,798 mailed Aug. 5, 2010, 6 pages.
Final Office Action for U.S. Appl. No. 12/488,798 mailed Jan. 31, 2011, 6 pages.
Notice of Allowance for U.S. Appl. No. 12/488,798 mailed Aug. 29, 2011, 10 pages.
Non-Final Office Action for U.S. Appl. No. 10/119,522 mailed Dec. 13, 2005, 15 pages.
Non-Final Office Action for U.S. Appl. No. 10/119,522 mailed Jul. 13, 2006, 15 pages.
Non-Final Office Action for U.S. Appl. No. 10/119,522 mailed Aug. 21, 2007, 15 pages.
Final Office Action for U.S. Appl. No. 10/119,522 mailed Mar. 18, 2008, 15 pages.
Notice of Allowance for U.S. Appl. No. 10/119,522 mailed Oct. 30, 2008, 10 pages.
Notice of Allowance for U.S. Appl. No. 10/119,522 mailed Feb. 18, 2009, 10 pages.
Supplemental Notice of Allowability for U.S. Appl. No. 09/775,305 mailed Apr. 7, 2006, 4 pages.
Supplemental Notice of Allowability for U.S. Appl. No. 09/775,305 mailed Apr. 12, 2006, 4 pages.
Attachment 2, *High Speed Data RLP* Lucent Technologies, Version 0.1, Jan. 18, 1997.
Azad et al., Multirate Spread Spectrum Direct Sequence CDMA Techniques, 1994, The Institute of Electrical Engineers.
Bell Labs Technical Journal, Lucent Technologies, vol. 2, No. 3, Summer 1997.
Budka et al., Cellular Digital Packet Data Networks, Bell Labs Technical Journal, Summer 1997, pp. 164-181.
Cellular Digital Packet Data, System Specification, Release 1.1, Jan. 19, 1995.
Chelouah, A., et al., "Angular Diversity Based on Beam Switching of Circular Arrays for Hiperlan Terminals," *Electronics Letters*, vol. 36, No. 5, pp. 387-388, (Mar. 2, 2000).
Chih-Lin I et al., IS-95 Enhancements for Multimedia Services, Bell Labs Technical Journal, pp. 60-87, Autumn 1996.
Chih-Lin I et al., Load and Interference Based Demand Assignment (LIDA) for Integrated Services in CDMA Wireless Systems, Nov. 18, 1996, pp. 235-241.
Chih-Lin I et al., Multi-Code CDMA Wireless Personal Communications Networks, Jun. 18, 1005.
Chih-Lin I et al., Performance of Multi-Code CDMA Wireless Personal Communications Networks, Jul. 25, 1995.
Chih-Lin I et al., Variable Spreading Gain CDMA with Adaptive Control for True Packet Switching Wireless Network, 1995, pp. 725-730.
Chung, Packet Synchronization and Identification for Incremental Redundancy Transmission in FH-CDMA Systems, 1992, IEEE, pp. 292-295.
*Data Service Options for Wideband Spread Spectrum Systems.* TIA/EIA Interim Standard. TIA/EIA/IS-707-A Apr. 1999.
Data Service Options for Wideband Spread Spectrum Systems: Introduction, PN-3676.1 (to be published as TIA/EIA/IS-707.1), Mar. 20, 1997 (Content Revision 1).
*Data Services Option Standard for Wideband Spread Spectrum Digital Cellular System.* TIA/EIA/IS-99. TIA/EIA Interim Standard. Jul. 1995.
*Data Services Options Standard for Wideband Spread Spectrum Systems: Packet Data Services. PN-3676.5 (to be published as TIA/EIA/IS-707.5) Ballot Version,* May 30, 1997.
Data Standard, Packet Data Section, PN-3676.5 (to be published as TIA/EIA/IS-DATA.5), Dec. 8, 1996, Version 02 (Content Revision 03).
Draft Text for "*95C" Physical Layer (Revision 4), Part 1, Document #531-981-20814-95C, Part 1 on 3GPP2 website (ftp://ftp.3gpp2.org/tsgc/working/1998/1298_Maui/WG3-TG1/531-98120814-95c,%20part%201.pdf).
Draft Text for "95C" Physical Layer (Revision 4), Part 2, Document #531-981-20814-95C, part 2 on 3GGP2 website (ftp://ftp.3gpp2.org/tsgc/working/1998/1298_Maui/WG3-TG1/531-98120814-95c,%20part%202.pdf, 1998).
Durnan, G.J., et al. "Optimization of Microwave Parabolic Antenna Systems Using Switched Parasitic Feed Structures," URSI National Science Meeting, Boulder, CO. p. 323, (Jan. 4-8, 2000).
Durnan, G.J., et al., "Switched Parasitic Feeds for Parabolic Antenna Angle Diversity," *Microwave and Optical Tech. Letters*, vol. 23, No. 4, pp. 200-2003(Nov. 20, 1999).
Ejzak et al., Lucent Technologies Air Interface Proposal for CDMA High Speed Data Service, Revision 0.1, May 5, 1997.
Ejzak et al., Lucent Technologies Air interface Proposal for CDMA High Speed Data Service, Apr. 14, 1997.
Ejzak, et al. *Proposal for High Speed Packet Data Service, Version 0.1*, Lucent Technologies, Jan. 16, 1997.

(56) References Cited

OTHER PUBLICATIONS

Elhakeem, Congestion Control in Signalling Free Hybrid ATM/CDMA Satellite Network, IEEE, 1995, pp. 783-787.
Giger, A.J., *Low-Angle Microwave Propagation: Physics and Modeling*, Norwood, MA, Artech House, (1991).
Hall et al., Design and Analysis of Turbo Codes on Rayleigh Fading Channels, IEEE Journal on Selected Areas in Communications, vol. 16, No. 2, Feb. 1998, pp. 160-174.
Harrington, R.F., "Reactively Controlled Antenna Arrays," *IEEE APS International Symposium Digest*, Amherst, MA. pp. 62-65, (Oct. 1976).
Harrington, R.F., "Reactively Controlled Directive Arrays," *IEEE Trans. Antennas and Propagation*, vol. AP-26, No. 3, pp. 390-395, (May 1978).
Heine, Gunnar, "The Air-Interface of GSM," *GSM Networks: Protocols, Terminology and Implementation*, (MA: Artech House, Inc.), 1999, Chapter 7, pp. 89-100.
High Data Rate (HDR) Solution, Qualcomm, Dec. 1998.
High Data Rate (HDR), cdmaOne optimized for high speed, high capacity data, Wireless Infrastructure, Qualcomm, Sep. 1998.
Hindelang et al., Using Powerful "Turbo" Codes for 14.4 Kbit/s Data Service in GSM or PCS Systems, IEEE Global Communications Conference, Phoenix, Arizona, USA, Nov. 3-8, 1997, vol. II, pp. 649-653.
Honkasalo, Harri. *High Speed Data Air Interface*. 1996.
*Introduction to cdma2000 Spread Spectrum System, Release C.* TIA/EIA Interim Standard. TIA/EIA/IS-2000.1-C. May 2002.
James, J.R. et al., "Electrically Short Monopole Antennas with Dielectric or Ferrite Coatings," Proc. IEEE, vol. 125, pp. 793-803, (Sep. 1978).
James, J.R., et al., "Reduction of Antenna Dimensions with Dielectric Loading," *Electronics Letters*, vol. 10, No. 13, pp. 283-265, (May 1974).
Kaiser et al., Multi-Carrier CDMA with Iterative Decoding and Soft-Interference Cancellation, Proceedings of Globecom 1997, vol. 1, pp. 523-529.
King, R.W.P., "The Many Faces of the Insulated Antenna," Proc. IEEE, vol. 64, No. 2, pp, 228-238, (Feb. 1976).
Kingsley, S.P., et al., "Beam Steering and Monopulse Processing of Probe-Fed Dielectric Resonator Antennas," *IEEE Proc.-Radar, Sonar Navigation*, vol. 146, No. 3, pp. 121-125. (Jun. 1999).
Knight, P., "Low-Frequency Behavior of the Beverage Aerial," *Electronics Letter*, vol. 13, No. 1, pp. 21-22, (Jan. 1977).
Knisely, Douglas, N. Telecommunications Industry Association Subcommittee TR-45.5—*Wideband Spread Spectrum Digital Technologies Standards*. Banff, Alberta. Feb. 24, 1997 (TR45.5/97.02.24)21.
Knisely, Douglas, N. Telecommunications Industry Association Subcommittee TR-45.5-Wideband Spread Spectrum Digital Technologies Standards, Working Group III-Physical Layer, Banff, Alberta, Feb. 24, 1997 (TR45.5/97.02.24)22.
Knisely, Lucent Technologies Air Interface Proposal for CDMA High Speed Data Service, Jan. 16, 1997.
Krzymien et al., Rapid Acquisition Algorithms for Synchronization of Bursty Transmissions in CDMA Microcellular and Personal Wireless Systems, IEEE Journal on Selected Areas in Communications, vol. 14, No. 3, Apr. 1996, pp. 570-579.
Kumar et al, An Access Scheme for High Speed Packet Data Service on IS-95 based CDMA, Feb. 11, 1997.
Lau et al., A Channel-State-Dependent Bandwidth Allocation scheme for Integrated Isochronous and Bursty Media Data in a Cellular Mobile Information System, IEEE, 2000, pp. 524-528.
Lee et al., "A Novel Hybrid CDMA/TDMA Protocol with a Reservation Request Slot for Wireless ATM Networks," IEICE Transactions on Communications, vol. E82-B, No. 7, pp. 1073-1076 (Jul. 25, 1999).
Liu et al., Channel Access and Interference Issues in Multi-Code DS-CDMA Wireless Packet (ATM) Networks, Wireless Networks 2, pp. 173-196, 1996.

Long, S.A., et al., "The Resonant Cylindrical Dielectric Cavity Antenna," *IEEE Trans. Antennas and Propagation*, vol. AP-31, No. 3. pp. 406-412, (May 1983).
Lu, J., et al., "Multi-beam Switched Parasitic Antenna Embedded in Dielectric for Wireless Communications Systems." *Electronics Letters*, vol. 37, No. 14, pp. 871-872, (Jul. 5, 2001).
Lucent Technologies Presentation First Slide Titled, Summary of Multi-Channel Signaling Protocol, Apr. 6, 1997.
Lucent Technologies Presentation First Slide Titled, Why Support Symmetric HSD (Phase 1C), Feb. 21, 1997.
Luzwick, J., et al., "A Reactively Loaded Aperture Antenna Array," *IEEE Trans Antennas and Propagation*, vol. AP-26, No. 4, pp. 543-547, (Jul. 1978).
McCallister, M.W. et al., "Resonant Hemispherical Dielectric Antenna," *Electronics Letters*, vol. 20, No. 16, pp. 657-659, (Aug. 1984).
McCallister, M.W., et al., "Rectangular Dielectric Resonator Antenna," *Electronics Letter*, vol. 19, No. 6, pp. 218-219, (Mar. 1983).
Melanchuk et al. *CDPD and Emerging Digital Cellular Systems*, Digest of Papers of COMPCN, Computer Society Conference 1996, Santa Clara, CA, No. CONF. 41, Feb. 25, 1996, pp. 2-8, XP000628458.
Milne, R.M.T., "A Small Adaptive Array Antenna for Mobile Communications," *IEEE APS International Symposium Digest*, pp. 797-800, (1985).
Mobile Station-Base Station Compatibility Standard for Wideband Spread Spectrum Cellular Systems, TIA/EIA Standard, TIA/EIA-95-B (Upgrade and Revision of TIA/EIA-95-A), Mar. 1999.
Motorola, Version 1.0. *Motorola High Speed Data Air interface Proposal Comparisions and Recommendations*. Jan. 27, 1997.
*MSC-BS Interface (A-Interface) for Public 808 MHz*. TIA/EIA/IS-634-A. TIA/EIA Interim Standard (Revision of TIA/EIA/IS-634) Jul. 1998.
*MSC-BS Interface for Public 800 MHz*.TIA/EIA/IS-634. TIA/EIA Interim Standard, Dec. 1995.
Network Wireless Systems Offer Business Unit (NWS OBU), Feature Definition Document for Code Division Multiple Access (CDMA) Packet Mode Data Services, FDD-1444, Nov. 28, 1996.
Ott, David TR45.5, CDMA WBSS Technical Standards Meeting Summary. Feb. 24-28, 1997 Banff, Alberta.
Ovesjö, Fredrik. "UTRA Physical Layer Description FDD Parts," European Telecommunication Standard, SMG2 UMTS Physical Layer Expert Group, XP002141421, v 0.4, Jun. 25, 1998, pp. 1-41.
Packet Data Service Option Standard for Wideband Spread Spectrum Systems, TIA/EIA Interim Standard, TIA/EIA/IS-657, Jul. 1996.
*Physical Layer Standard for cdma2000 Spread Spectrum Systems, Release C.* TIA/EIA Interim Standard. TIA/EIA/IS-2000.2C. May 2002.
Preston, S., et al., "Direction Finding Using a Switched Parasitic Antenna Array," *IEEE APS International Symposium Digest*, Montreal, Canada, pp. 1024-1027, (1997).
Preston, S.L., et al., "A Multibeam Antenna Using Switched Parasitic and Switched Active Elements for Space-Division Multiple Access Applications," *IEICE Trans. Electron.*, vol. E82-C, No. 7, pp. 1202-1210, (Jul. 1999).
Preston, S.L., et al., "Base-Station Tracking in Mobile Communications using a Switched Parasitic Antenna Array," *IEEE Trans. Antennas and Propagation*, vol. 46, No. 6, pp. 841-844, (Jun. 1998).
Preston, S.L., et al., "Electronic Beam Steering Using Switched Parasitic Patch Elements," *Electronics Letters*, vol. 33, No. 1, pp. 7-8, (Jan. 2, 1997).
Preston, S.L., et al., "Size Reduction of Switched Parasitic Directional Antennas Using Genetic Algorithm Optimization Techniques," *Asia Pacific Microwave Conference Proceedings*, Yokohama, Japan, pp. 1401-1404, (1998).
Preston, S.L., et al., "Systematic Approach to the Design of Directional Antennas Using Switched Parasitic and Switched Active Elements," *Asia Pacific Microwave Conference Proceedings*, Yokohama, Japan. pp. 531-534, (1998).
Puleston, PPP Protocol Spoofing Control Protocol, Global Village Communication (UK) Ltd., Feb. 1996.

(56) References Cited

OTHER PUBLICATIONS

Reed et al., Iterative Multiuser Detection for CDMA with FEC: Near-Single-User Performance, IEEE Transactions on Communications, vol. 46, No. 12, Dec. 1998, pp. 1693-1699.

Ruze, J., "Lateral-Feed Displacement in a Paraboloid," *IEEE Trans. Antennas and Propagation*, vol. 13, pp. 660-665, (1965).

Scott, N.L., et al., "Diversity Gain from a Single-Port Adaptive Antenna Using Switched Parasitic Elements Illustrated with a Wire and Monopole Prototype," *IEEE Trans. Antennas and Propagation*, vol. 47, No. 6, pp. 1066-1070, (Jun. 1999).

Shacham, et al., "A Selective-Repeat-ARQ Protocol for Parallel Channels and Its Resequencing Analysis," IEEE Transactions on Communications, XP000297814, 40 (4): 773-782 (Apr. 1997).

Sibille, A., et al., "Circular Switched Monopole Arrays for beam Steering Wireless Communications," *Electronics Letters*, vol. 33, No. 7, pp. 551-552, (Mar. 1997).

Simpson, W. (Editor). "RFC 1661—The Point-to-Point Protocol (PPP)." Network Working Group, Jul. 1994, pp. 1-35. http://www.faqs.org/rfcs/rfc1661.html.

Simpson, W. (Editor). "RFC 1662—PPP in HDLC-Like Framing." Network Working Group, Jul. 1994, pp. 1-17. http://www.faqs.org/rfcs/rfc1662.html.

Skinner et al., Performance of Reverse-Link Packet Transmission in Mobile Cellular CDMA Networks, IEEE, 2001, pp. 1019-1023.

Stage 1 Service Description for Data Services—High Speed Data Services (Version 0.10) CDG RF 38. Dec. 3, 1996.

*Support for 14.4 kbps Data Rate and PCS Interaction for Wideband Spread Spectrum Cellular Systems*. TSB74, Dec. 1995. TIA/EIA Telecommunications Systems Bulletin.

*Telecommunications industry Association Meeting Summary*. Task Group I, Working Group III, Subcommittee TR45.5. Feb. 24-27, 1997. Banff, Alberta.

*Telecommunications Industry Association Meeting Summary*. Task Group I, Working Group III, Subcommittee TR45.5. Jan. 6-8, 1997, Newport Beach, California.

Third Generation Partnership Project 2, "cdma2000 High Rate Packet Data Air Interference Specification," 3GPP2 C.S0024 Version 2.0 (Oct. 27, 2000).

Third Generation Partnership Project 2, "Physical Layer Standard for cdma2000 Spread Spectrum Systems," 3GPP2 C.0002-0 Version 1.0 (Jul. 1999).

Third Generation Partnership Project, "3rd Generation Partnership Project (3GPP): Technical Specification Group (TSG) RAN WG4; Requirements for Support of Radio Resource Management (FDD)," 3G TS 25.133 V3.0.0 (Dec. 1999).

Third Generation Partnership Project, "Technical Specification Group Radio Access Network; Physical Layer Procedures (FDD) (Release 1999)." 3GPP TS 25.214 v3.5 0 (Dec. 2000).

Third Generation Partnership Project, "Technical Specification Group Radio Access Network; Physical Layer Procedures (FDD) (Release 1999)," 3GPP TS 25.214 v3.10.0 (Mar. 2002).

Third Generation Partnership Project. "Technical Specification Group Radio Access Network; Physical layer procedures (TDD) (Release 1999)," 3GPP TS 25.224 V3.10.0 (Mar. 2002).

Third Generation Partnership Project. "Technical Specification Group Radio Access Network; Physical layer procedures (TDD) (Release 1999)," 3GPP TS 25.224 V3.5.0 (Dec. 2000).

Third Generation Partnership Project, "Technical Specification Group Radio Access Network; Spreading and modulation (TDD) (Release 1999)," 3GPP TS 25.223 V3.8.0 (Mar. 2002).

Third Generation Partnership Project, "Technical Specification Group Radio Access Network; Spreading and modulation (TDD) (Release 1999)," 3GPP TS 25.223 V3.4.0 (Sep. 2000).

Third Generation Partnership Project, "Technical Specification Group Radio Access Network; Physical Layer Procedures (FDD) (Release 4)," 3GPP TS 25.214 v4.4.0 (Mar. 2002).

Third Generation Partnership Project, "Technical Specification Group Radio Access Network; Physical Layer Procedures (FDD) (Release 5)," 3GPP TS 25.214 v5.0.0 (Mar. 2002).

Third Generation Partnership Project, "Technical Specification Group Radio Access Network; Physical layer procedures (TDD) (Release 4)," 3GPP TS 25.224 V4.4.0 (Mar. 2002).

Third Generation Partnership Project, "Technical Specification Group Radio Access Network; Physical layer procedures (TDD) (Release 5)," 3GPP TS 25.224 V5.0.0 (Mar. 2002).

Third Generation Partnership Project, "Technical Specification Group Radio Access Network; Spreading and modulation (TDD) (Release 4)," 3GPP TS 25.223 V4.3.0 (Dec. 2001).

Third Generation Partnership Project, "Technical Specification Group Radio Access Network; Spreading and modulation (TDD) (Release 5)," 3GPP TS 25.223 V5.0.0 (Mar. 2002).

Third Generation Partnership Project, "Technical Specification Group Radio Access Networks; Requirements for Support of Radio Resource Management (FDD) (Release 1999)," 3GPP TS 25.133 V3.3.0 (Sep. 2000).

Third Generation Partnership Project, "Technical Specification Group Radio Access Network; Radio Resource Management Strategies (3G TR 25.922 version 3.0.0)," 3G TR 25.922 V3.0.0 (Dec. 1999).

Third Generation Partnership Project, "Technical Specification Group Radio Access Network; Radio Resource Management Strategies (Release 1999)," 3G TR 25.922 V3.4.0 (Dec. 2000).

Third Generation Partnership Project, "Technical Specification Group Radio Access Network; MAC protocol specification (3G TS 25.321 version 3.2.0)." 3G TS 25.321 V3.2.0 (Dec. 1999).

Third Generation Partnership Project, "Technical Specification Group Radio Access Network; MAC protocol spedfication (Release 1999)." 3G TS 25.321 V3.6.0 (Dec. 2000).

Third Generation Partnership Project, "Technical Specification Group Radio Access Network; Services provided by the physical layer (Release 1999)," 3GPP TS 25.302 V3.7.0 (Dec. 2000).

Third Generation Partnership Project, "Technical Specification Group Radio Access Network; Services provided by the physical layer (Release 1999)," 3GPP TS 25.302 V3.2.0 (Dec. 1999).

Third Generation Partnership Project. "Technical Specification Group Radio Access Network; Physical channels and mapping of transport channels onto physical channels (TDD) (3G TS 25.221 version 3.1.0)," 3G TS 25.221 V3.1.0 (Dec. 1999).

Third Generation Partnership Project, "Technical Specification Group Radio Access Network; Physical channels and mapping of transport channels onto physical channels (TDD) (Release 1999)," 3G TS 25.221 V3.5.0 (Dec. 2000).

Third Generation Partnership Project, "Technical Specification Group Radio Access Network; RRC Protocol Specification (3G TS 25.331 version 3.1.0 Release 1999)," 3G TS 25.331 V3.1.0 (Jan. 2000).

Third Generation Partnership Project, "Technical Specification Group Radio Access Network; RRC Protocol Specification (Release 1999)," 3GPP TS 25.331 V3.5.0 (Dec. 2000).

Third Generation Partnership Project, "Technical Specification Group Radio Access Network, Synchronisation in UTRAN Stage 2 (Release 1999)," 3GPP TS 25.402 V3.4.0 (Dec. 2000).

Third Generation Partnership Project, "Technical Specification Group Radio Access Network, Synchronisation in UTRAN Stage 2 (3G TS 25.402 version 3.0.0 Release 1999)," 3GPP TS 25.402 V3.4.0 (Dec. 2000).

Third Generation Partnership Project, "Technical Specification Group Radio Access Network; UE Procedures in Idle Mode and Procedures for Cell Reselection in Connected Mode (3G TS 25.304 version 3.1.0)," 3G TS 25.304 V3.1.0 (Dec. 1999).

Third Generation Partnership Project, "Technical Specification Group Radio Access Network; UE Procedures in Idle Mode and Procedures for Cell Reselection in Connected Mode (Release 1999)," 30 TS 25.304 V3.5.0 (Dec. 2000).

Third Generation Partnership Project, "Technical Specification Group Radio Access Network; Physical channels and mapping of transport channels onto physical channels (FDD) (3G TS 25.211 version 3.1.0)." 3G TS 25.211 V3.1.0 (Dec. 1999).

Third Generation Partnership Project, "Technical Specification Group Radio Access Network; Physical channels and mapping of transport channels onto physical channels (FDD) (Release 1999)," 3GPP TS 25.211 V3.5.0 (Dec. 2000).

(56) References Cited

OTHER PUBLICATIONS

Third Generation Partnership Project, "Technical Specification Group Radio Access Network; Multiplexing and channel coding (FDD) (Release 1999)," 3GPP TS 25.212 V3.5.0 (Dec. 2000).
Third Generation Partnership Project, "Technical Specification Group Group Radio Access Network; Multiplexing and channel coding (FDD) (3G TS 25.212 version 3.1 0)," 3G TS 25.212 V3.1.0 (Dec. 1999).
Third Generation Partnership Project, "Technical Specification Group (TSG) RAN W04 UE Radio transmission and Reception (FDD)," TS 25.101 V3.1.0 (Dec. 1999).
Third Generation Partnership Project, "Technical Specification Group Radio Access Network; Physical layer—General description (3G TS 25.201 version 3.0.0)," 3G TS 25.201 V3.0.0 (Oct. 1999).
Third Generation Partnership Project, "Technical Specification Group Radio Access Network; Physical layer—General description (Release 1999)," 3G TS 25.201 V3.1.0 (Jun. 2000).
Third Generation Partnership Project, "Technical Specification Group Radio Access Networks; UE Radio Transmission and Reception (FDD) (Release 1999)," 3GPP TS 25.101 V3.5.0 (Dec. 2000).
TIA/EIA Interim Standard, "Mobile Station-Base Station Compatibility Standard for Dual-Mode Wideband Spread Spectrum Cellular System," TIA/EIA/IS-95-A (May 1995).
TIA/EIA Interim Standard, Mobile Station-Base Station Compatibility Standard for Dual-Mode Wideband Spread Spectrum Cellular System. TIA/EIA/IS-95 (Jul. 1993).
Tsui et al., "Sensitivity of EW Receivers," Microwave Journal, vol. 25, pp. 115-117, 120 (Nov. 1982).
*Upper Layer (Layer 3) Signaling Standard for cdma2000 Spread Spectrum Systems, Release C.* TIA/EIA Interim Standard. TIA/EIA/IS-2000.5-C. May 2002.
Vaughn, R., "Switched Parasitic Elements for Antenna Diversity," *IEEE Trans. Antennas and Propagation*, vol. 47, No. 2, pp. 399-406, (Feb. 1999).
Viterbi, The Path to Next Generation Services with CDMA, Qualcomm Incorporated, 1998 CDMA Americas Congress, Los Angeles, California, Nov. 19, 1998.
Wang et al., The Performance of Turbo-Codes in Asynchronous DS-CDMA, IEEE Global Communications Conference, Phoenix, Arizona, USA, Nov. 3-8, 1007, Gol. III, pp. 1548-1551.
www.cdg.org/news/press/1997.asp CDA Press Release Archive, 1997.
Yang, Samuel C., "Principies of Code Division Multiple Access," In CDMA RF System Engineering, (MA: Artech House, Inc.). 1998, Chapter 4, pp. 75-103.

* cited by examiner

USE OF CORRELATION COMBINATION TO ACHIEVE CHANNEL DETECTION

RELATED APPLICATIONS

This application is a continuation of U.S. patent application Ser. No. 13/306,547, filed on Nov. 29, 2011, now U.S. Pat. No. 8,638,877, issued Jan. 28, 2014, which is a continuation of U.S. patent application Ser. No. 12/488,798, filed on Jun. 22, 2009, now abandoned on Nov. 30, 2011, which is a continuation of U.S. patent application Ser. No. 10/119,522, filed on Apr. 9, 2002, now U.S. Pat. No. 7,551,663, issued Jun. 23, 2009, which is a continuation-in-part of U.S. patent application Ser. No. 09/775,305 filed Feb. 1, 2001, now U.S. Pat. No. 7,079,523, issued Jul. 18, 2006. This application claims priority from U.S. Provisional Application No. 60/282,936, filed on Apr. 10, 2001. This application is also related to U.S. patent application Ser. No. 09/738,934 filed Dec. 15, 2000. The entire teachings of the above applications are incorporated herein by reference.

BACKGROUND

Code Division Multiple Access (CDMA) modulation is a multi-user access transmission scheme in which signals from different users overlap both in frequency and in time. This is in contrast with Frequency Division Multiple Access (FDMA) in which user signals overlap in time, but are assigned unique frequencies, and Time Division Multiple Access (TDMA) in which user signals overlap in frequency, but are assigned unique time slots. CDMA signaling is frequently used in cellular communication systems between a base station within a cell and a plurality of access units, e.g., wireless handsets, in the possession of users within the cell. The CDMA transmitted signal for each user that broadcasts from the user's access unit is spread over a wide bandwidth, which is greater than the initial user information bandwidth. Each user's signal is spread by a different spreading code to create a wideband spread. All of the spread wideband signals transmitted by the different users are received at the base station and form a composite received signal. The receiver at the base station distinguishes different users by using a local copy (or local reference) of the spreading code, which is available to both the access units and the base station in the CDMA system. Such a process is called channelization.

In an exemplary CDMA system according to the IS-95 standard, channels are defined for a reverse link, i.e., when an access unit is transmitting to a base station in the system, using a code called a pseudorandom noise (PN) code. The receiver at the base station detects the desired signal from a particular user out of the composite signal by correlating the composite signal with the original PN code. All other signals having codes that do not match the code for the desired user code are rejected by the correlator.

An exemplary CDMA reverse link includes a plurality of channels, e.g., access and traffic channels (or even more channel types depending on the design of the CDMA system). The traffic channel is used to transmit user data and voice, as well as signaling messages. The access channel is used on the reverse link to communicate control information to the base station. For example, when the access unit does not have a traffic channel assigned, the access channel is used to make call originations and to respond to pages and orders. The traffic channels are principally used to communicate voice or data payload information but are also used for other functions.

SUMMARY

In presently proposed so-called third generation (3G) systems, multiple traffic channels may be assigned to each user, and the traffic channels may be encoded at different rates. This requires a receiver to configure a correlator for different data rates such that a single output is produced for a particular data rate. However, if multiple outputs and options are required, without a priori knowledge as to which channel is used, multiple codes must be searched, thus requiring multiple correlators. Such requirements contribute to the complexity and increase the cost of the receiver design.

There is a need for a wireless system with a flexible, simple receiver design. A wireless communications system is particularly needed that provides a single correlator in the receiver which can be used to receive multiple channels.

In general, the present invention relates to use of combinations of correlation results to achieve detection of multiple coded signals at a receiver in a wireless communications system. One aspect of the invention provides a method of detecting coded signals wherein the code applied to the signal includes a lower rate code and a higher rate code. The lower rate code is a nested or tiered code such that it comprises at least two repetitions or two sequences of the higher rate code. The received coded signal is correlated with the higher rate code using a single higher rate correlator to provide a higher rate code correlation result. The higher rate code correlation results are fed to two or more lower rate code correlators that combine multiple higher rate code correlation results, each using a different lower rate code, to provide corresponding lower rate code correlation results. The presence of at least one coded signal can be determined from the lower rate code correlation results.

In an embodiment that uses a first lower rate code and a second lower rate code, the presence of one or another of two mutually exclusive coded signals can be determined from the corresponding first and second lower rate code correlation results. In particular, the first and second lower rate code correlation results are compared with each other to determine the presence of either a first indication corresponding to the first lower rate code or a second indication corresponding to the second lower rate code. In one embodiment, one of the two indications corresponds to a request by an access unit to enter an active mode in order to communicate a data payload from the access unit to a base station in a wireless communications system. The other indication corresponds to a notification by the access unit to the base station that the access unit desires to remain in a standby mode.

According to another aspect of the invention, N lower rate codes are used in the detection to provide M lower rate code correlation results. The presence of at least one coded signal can be determined from the N lower rate code correlation results. The N lower rate codes can be selected from a set of M possible codes based on a priori system information. The system information can be used to limit the hypothesis outcomes, if any are known, such as the mutual exclusivity of the presence of coded signals. In one embodiment, the set of M possible codes may represent data or instructions relating to a set of nearby base stations that are candidates for possible cell handoff and N may represent the subset of the M nearby base stations that are identified as actual active candidates based on system criteria such as signal strength or signal-to-noise figure.

The lower rate codes are preferably orthogonal to each other and can be Walsh codes, Gutleber codes, maximum length (M)-sequences, or PN-sequences.

According to another aspect of the invention, detection of the received coded signal is provided independent of the correlation method that is used. In particular, for a code applied to the signal that includes a nested code, the nested code being one of a set of M possible nested codes, the detection method comprises correlating the received coded signal to provide N nested code correlation results and determining the presence of at least one coded signal from the N nested code correlation results.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
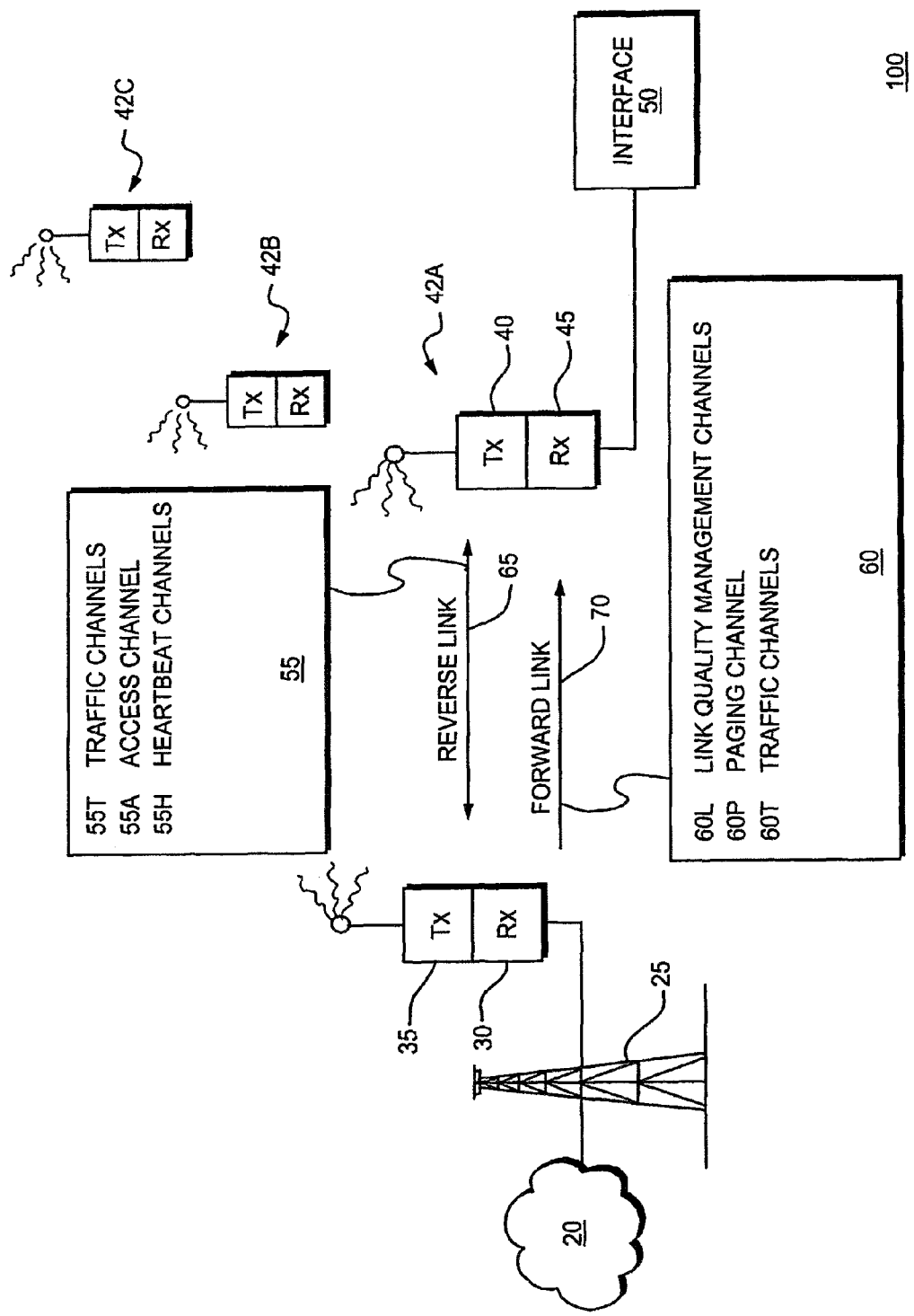
FIG. 1 is a general diagram illustrating a wireless communication system.

FIG. 1 is a diagram of a wireless communications system 100 according to the principles of the present invention. A base station 25 maintains wireless communication links with a plurality of access units 42A, 42B, 42C (collectively, access units 42) as shown. Such wireless links are established based upon assignment of resources on a forward link 70 and a reverse link 65 between the base station 25 and access units 42. Each link 65 or 70 is typically made up of several logical channels 55 or 60.

The system 100 supports communications between interface 50 and network 20. Network 20 is typically a Public Switched Telephone Network (PSTN) or computer network such as the Internet. Interface 50 is preferably coupled to a digital processing device such as a portable computer (not shown), to provide wireless access to network 20.

In an illustrative embodiment, the forward link channels 60 and reverse link channels 55 are defined in the wireless communications system 100 as Code Division Multiple Access (CDMA) channels. That is, each CDMA channel is preferably defined by encoding data to be transmitted over the channel with a channel code. The channel coded data is then modulated onto a radio frequency carrier. This enables a receiver to decipher one CDMA channel from another knowing only the particular channel code assigned to that channel.

The forward link channels 60 include at least three logical channel types. Included among these are a Link Quality Management (LQM) channel 60L, a paging channel 60P, and multiple traffic channels 60T.

The reverse link 65 includes heartbeat channels 55H, an access channel 55A and multiple traffic channels 55T. Generally, the reverse link channels 55 are similar to the forward link channels 60 except that each reverse link traffic channel 55T may support variable data rates from 2.4 kbps to a maximum of 160 kbps.

Data transmitted between base station 25 and an access unit 42 typically consists of encoded digital information, such as hypertext transfer protocol (HTTP) encoded Web page data. Based on the allocation of traffic channels in the reverse link 65 or forward link 70, data transfer rates are generally limited by the number of available traffic channels 55T, 60T.

Figure 2:
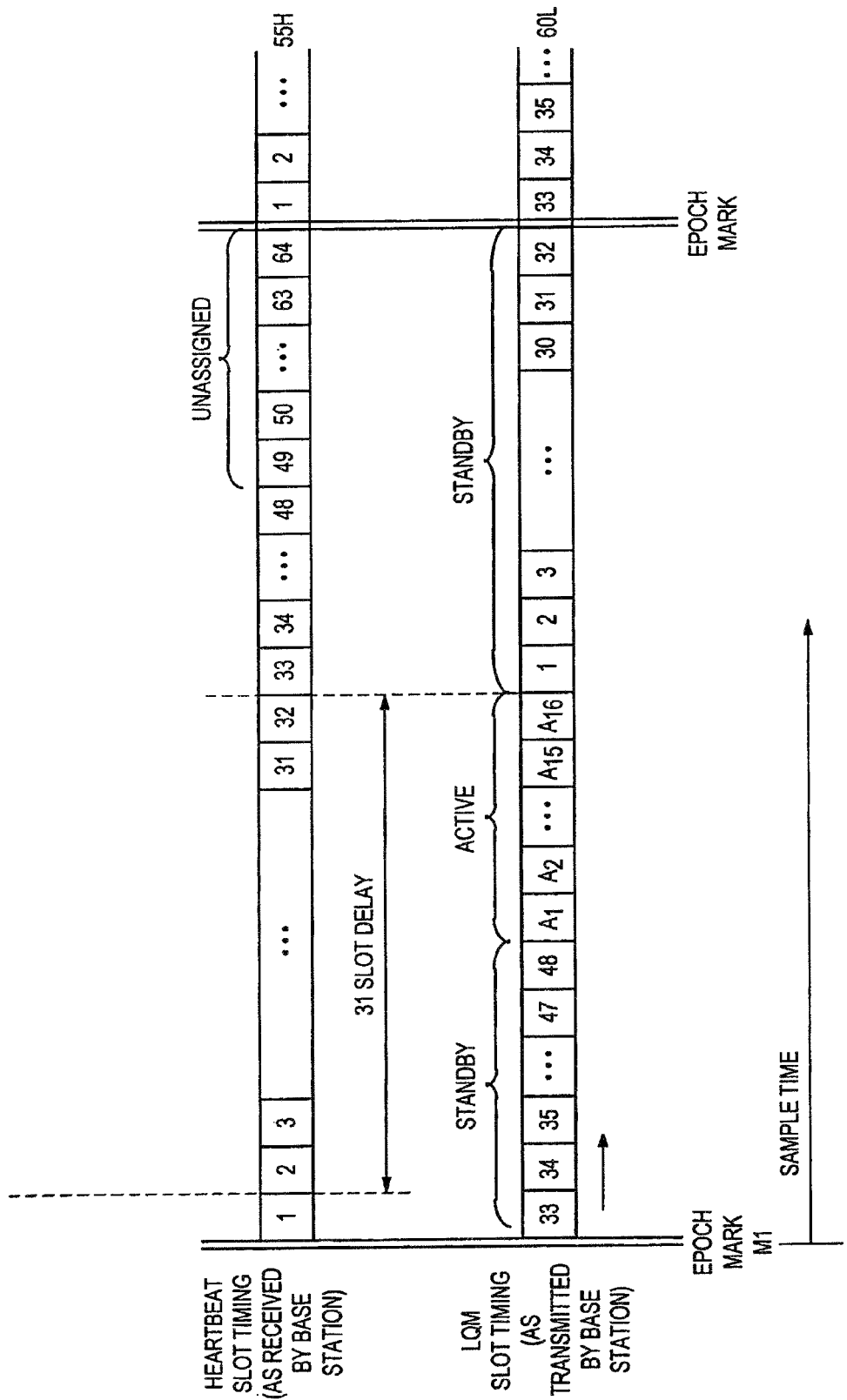
FIG. 2 is a timing diagram illustrating heartbeat slot and link quality management (LQM) slot timing.

As shown in FIG. 2, the forward link LQM channel 60L is partitioned into a predetermined number of periodically repeating time slots for the transmission of messages to each of multiple access units 42. Each access unit 42A identifies messages directed to itself based upon messages received in an assigned time slot.

The reverse link heartbeat channel 55H is shared among multiple users. For example, the heartbeat channel 55H is also partitioned into periodically repeating time slots. Each time slot is assigned to one of many access units 42 for transmitting heartbeat messages to the base station 25. Accordingly, the base station 25 identifies from which access unit 42A a message is transmitted based upon the receipt of a message in a particular time slot. The heartbeat channel 55H and the LQM channel 60L are described in more detail below.

In the following description, reference is again generally made to FIG. 1, but more specific details of LQM channel 60 and heartbeat channel 55H are referenced to FIG. 2.

Generally, to establish a synchronized link with the base station 25, access units 42 transmit link request messages on the access channel 55A to base station receiver 35 via access unit transmitter 40. Messages are then acknowledged and processed at the base station 25. If available, resources are then allocated at the base station 25 to establish a bidirectional communication link with the requesting access unit 42A.

Within the forward link 70, the paging channel 60P is used by the base station transmitter 30 to send overhead and paging messages or commands to the access unit receiver 45. Overhead information includes data such as system configuration parameters for establishing wireless links with access units 42.

As mentioned previously, wireless communication system 100 includes a heartbeat channel 55H in the reverse link 65 and link quality management channel (LQM) 60L in the forward link 70. These channels are shared between the base station 25 and multiple access units 42. That is, the base station 25 transmits messages to multiple access units 42 using the same forward link LQM channel 60L, where a message to a particular access unit 42A is transmitted in an assigned time slot. In this way, time slot assignments serve as a way of addressing messages to a particular access unit and corresponding communication link.

The present system can support users that require on-demand, sporadic high speed throughput. For example, remote users connected to the Internet over a wireless link typically require high speed throughput when downloading an object file such as a Web page. Such users then typically do not require any data transfer for a period of time. To support such users, it is advantageous to maintain synchronization with the base station for future on-demand data transfers. This is achieved in the wireless communication system 100 by maintaining a minimal connection with the base station 25 even when no data is being actively transferred between the base station 25 and a specific access unit 42.

Repeatedly creating or reviving connections for users who sporadically need a link can be time consuming and an inefficient use of resources. It is also inefficient to reserve resources such as traffic channels 55T for subscribers who are not transmitting data. Accordingly, traffic channels 55T are allocated on an as-needed basis to support data transfers, optimizing the use of available resources in wireless communication system 100.

FIG. 2 is a timing diagram for the heartbeat channel 55H and LQM channel 60L. Preferably, there are two LQM channels 60L and two heartbeat channels 55H since channels are typically allocated in pairs. However, only one of each channel type is shown in FIG. 2 for illustrative purposes.

As shown, 64 time slots (in each direction) are defined per EPOCH period in each of the heartbeat 55H and LQM 60L channels. The EPOCH period in the illustrated embodiment is 13.3 mS, so that each time slot is 208 mS or 256 code chips where a chip is a unit of time that corresponds to the output interval of the spreading code. Because time slots repeat on a periodic basis, base station 25 exchanges information with a particular access unit 42A every EPOCH or 13.3 mS.

Data transmissions on the LQM channel 60L are maintained by the base station 25, which is preferably used as a master timing reference. That is, timing of the access units 42 is aligned with base station 25. Access units 42, therefore, must synchronize themselves to the base station 25, and specifically to the LQM channel 60L, in order to maintain synchronization with the base station 25.

Generally, a link between the base station 25 and an access unit 42A is maintained in one of three modes: active, standby or idle. Synchronization between base station 25 and a particular access unit 42A is maintained only for the active and standby mode.

While in the active mode, synchronization of the forward and reverse link is maintained between the LQM channel 60L and traffic channels 55T since the heartbeat channel time slot is no longer dedicated on the reverse link 65 to. the access unit 42A.

Each access unit 42A in the standby mode is assigned one time slot in the forward link LQM channel 60L and one time slot in the reverse link heartbeat channels 55H. Accordingly, information is targeted to a receiving access unit 42A (subscriber) based upon the transmission of a message in a particular time slot. For example, an access unit 42A assigned to time slot #1 decodes information received in time slot #1 on the forward link LQM channel 60L, while data is transmitted back to the base station 25 from access unit 42A in time slot #1 of the reverse link heartbeat channel 55H. Both base station 25 and access unit 42A identify to which link a message pertains based on receipt of a message in a particular time slot. It should be noted that although the LQM channel 60L is used as the time reference as described above, the principles of the present invention equally apply where the heartbeat channel 55H is alternatively used as a master timing reference rather than the LQM channel 60L. In other words, base station 25 is optionally synchronized with respect to an access unit 42A.

In the standby mode, synchronization is maintained between the forward link LQM channel 60L and reverse link heartbeat channel 55H based upon messages sent in the appropriate time slot on the LQM channel 60L indicating to a particular access unit 42A whether messages transmitted to the base station 25 from that access unit are received in the appropriate time slot. Message transmissions from the access unit transmitter 40 to base station 25 on the heartbeat channel 55H are analyzed at base station receiver 35 to achieve fine tuning alignment between base station 25 and each of multiple access units 42.

As shown in FIG. 2, time slots A, through A, 6 of the LQM channel 60L are reserved for access units 42 in the active mode, indicating that data is being transferred between the access unit 42A and the base station 25. Contrariwise, time slots numbered 1-48 are reserved for access units 42 operating in the standby mode on the LQM channels 60L.

At any given time, there are typically no more than 48 time slots in the heartbeat channel 55H or LQM channel 60L assigned to respective access units 42. This ensures that on completion of a data transfer between an access unit 42A and base station 25, an access unit 42A in the active mode assigned an active time slot can revert back to the standby mode and consequently be assigned an unused standby mode time slot 1-48 in the LQM channel 60L again.

The details relating to use of the LQM channel 60L and heartbeat channels 55H for synchronization and timing alignment are disclosed in the above-mentioned U.S. patent application Ser. No. 09/775,305.

A set of channel codes are used at the access units 42, one code of which is generally to be transmitted in the assigned time slot in the reverse link heartbeat channel 55H. The transmission of this code is used as a signal received by the base station 25 to retain synchronization with the access unit 42A while in a "standby" mode. Each code however, may also correspond to a particular command or request. For example, one code is used to notify the base station that the access unit 42A is ready to begin transmitting a data payload to the base station, i.e., an access unit requests to go into an "active" transmission mode. This is referred to herein as a "heartbeat with request" signal. Another code is used to notify the base station that the access unit desires to remain in standby mode. This is referred to herein as a "heartbeat" signal.

The wireless system according to the invention provides three tiers of data rates, i.e., tier 1, tier 2, and tier 3, for use by the CDMA channels. At tier 1, a transmitter transmits 8 chips per symbol to a receiver. At tier 2, the transmitter transmits 32 chips per symbol to the receiver. At tier 3, the transmitter transmits 128 chips per symbol.

Figure 3:
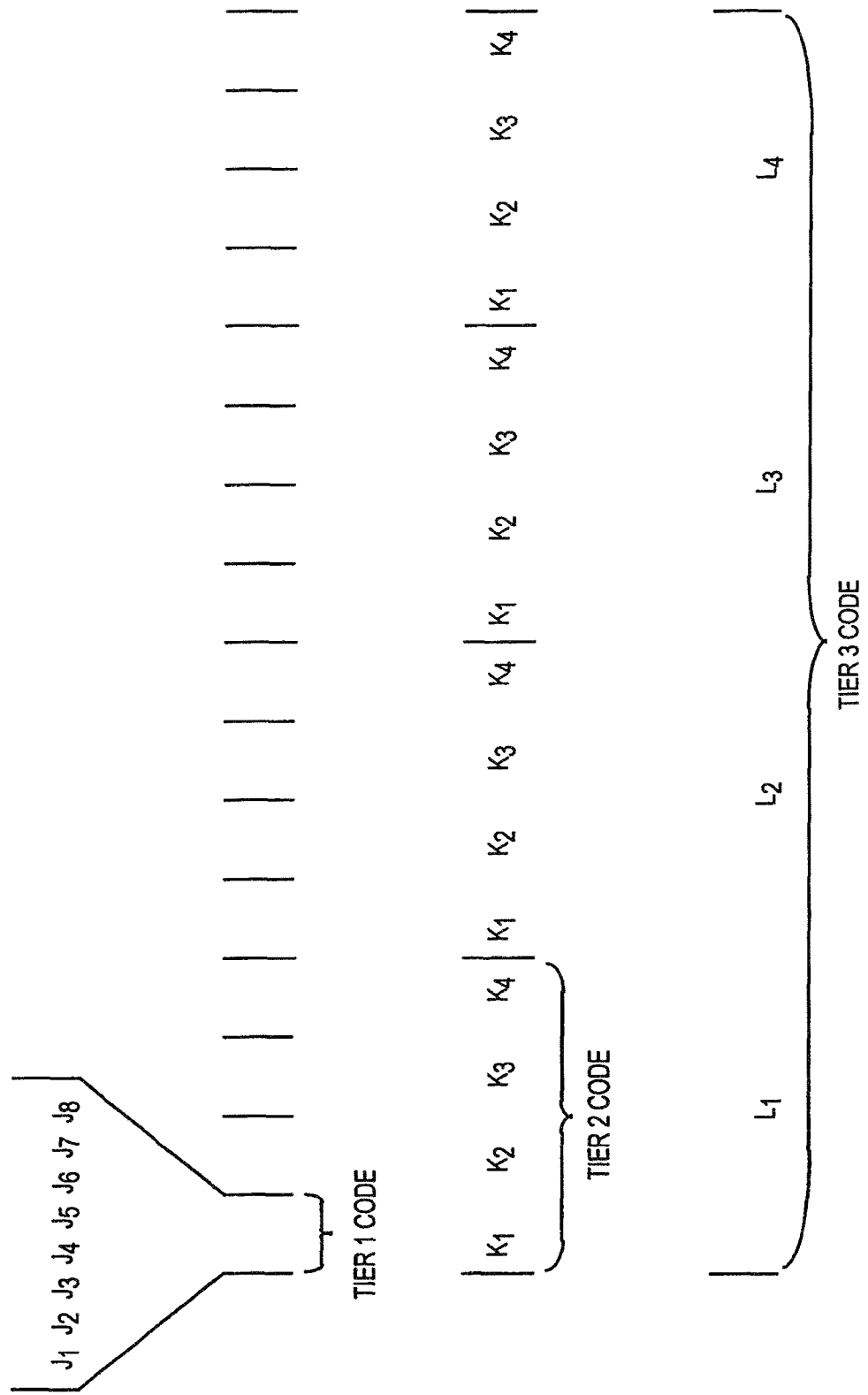
FIG. 3 is a diagram illustrating the relationship among tier 1, tier 2 and tier 3 code sequences.

FIG. 3 shows the relationship between tiers 1, 2 and 3 in more detail. In particular, what is shown is a nesting of the codes. A tier 1 code comprises an 8 chip sequence $J_1$ through $J_8$. The tier 2 code comprises 4 code elements, $K_1$ through $K_4$. Each of the code elements $K_1$ through $K_4$ is composed of, is aligned with, and has a duration equal to, a tier 1 code sequence $J_1$ through $J_8$. That is, the code boundary of the tier 1 code coincides with each of the tier 2 code elements $K_1$ through $K_4$. Thus, the tier 2 code repeats every 32 chips. Likewise, the tier 3 code comprises code elements, $L_1$ through $L_4$. Each code element of the tier 3 code is composed of, is aligned with a corresponding tier 2 code sequence, $K_1$ through $K_4$. Thus, the tier 3 code sequence, $L_1$ through $L_4$, has a duration of 128 chips.

Figure 4:
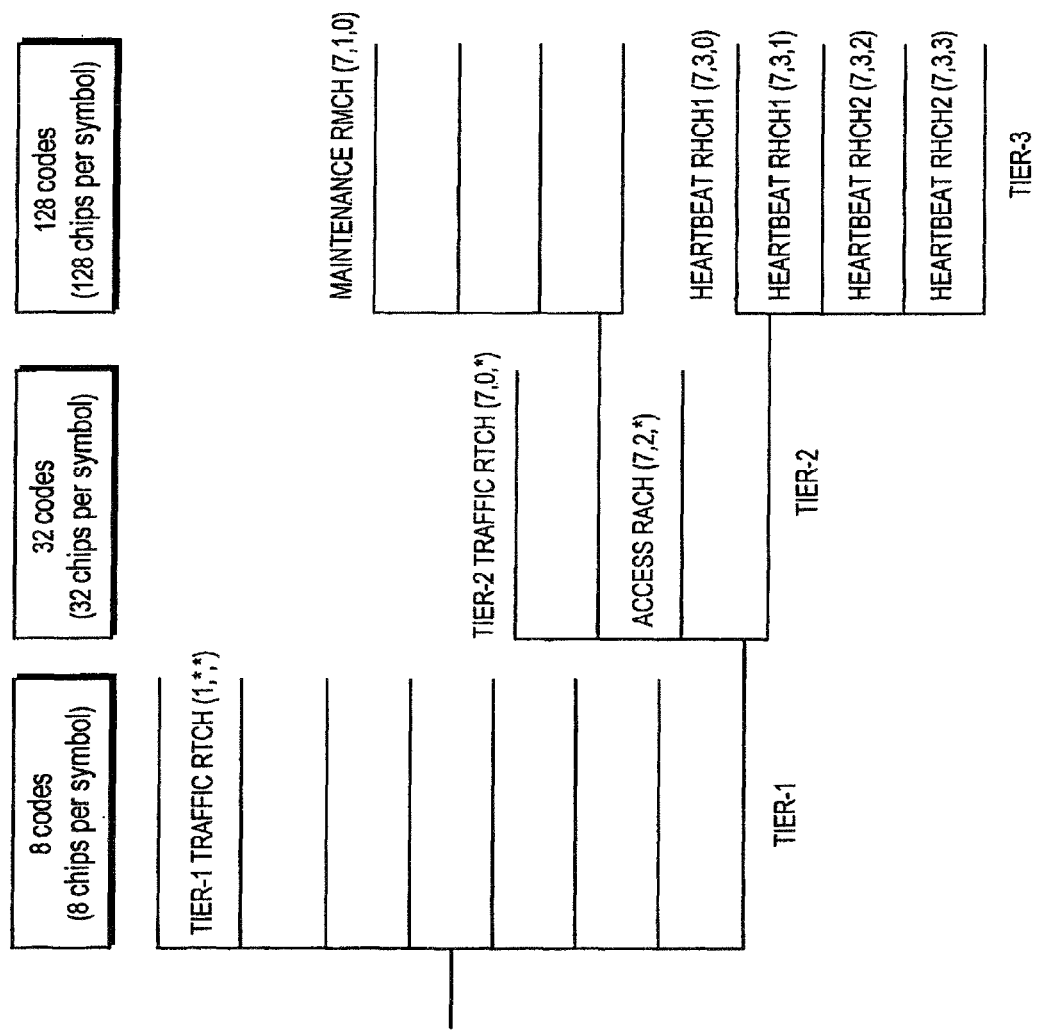
FIG. 4 is a diagram illustrating a selected set of codes in a tiered code structure.

In the preferred embodiment, the difference between the channel code assigned to the heartbeat signal versus the heartbeat with request signal is the specific tier 3 code that is applied. That is, the channel codes assigned to the heartbeat and heartbeat with request signals are selected such that the tier 1 and tier 2 codes are the same for each signal. The difference is only in the tier 3 code sequence that nests the tier 1 and tier 2 codes. The nesting of the tier 1 and tier 2 codes with respect to the tier 3 codes for the heartbeat and heartbeat with request signals is illustrated in FIG. 4, which shows a tree structure for the tiered codes. In particular, four codes that are assigned to heartbeat and heartbeat with request signals are indicated as individual branches connected to a common tier 2 branch that is in turn connected to a particular tier 1 branch. Other branches are shown to indicate channel code assignments for other channels, e.g., traffic, maintenance and access channels. The notation (X, Y, Z) is used to indicate the branches assigned at each tier to the particular code. Thus, one code (7, 3, 0) is reserved for the heartbeat signal while another code (7, 3, 1) is reserved for the heartbeat with request signal. Another optional heartbeat signaling pair uses codes (7, 3, 2) and (7, 3, 3). Note that other channels (e.g., traffic, access and maintenance) can be assigned other unique codes, as shown in the tree structure.

The tier 3 codes are preferably orthogonal to each other. The orthogonal codes can be Walsh codes or Gutleber codes or other code such as maximal length (M)-sequences or PN-sequences. It should be noted that while a three-level or three-tiered code is used in the preferred embodiment, other embodiments can use two tiers. For example, a 64 chip tier 1 code nested in a four element tier 2 code, that is, 256 chips in length could be used. Another two-tiered code includes a 16 chip tier 1 code nested in an eight element tier 2 code, that is, 128 chips in length.

Figure 5:
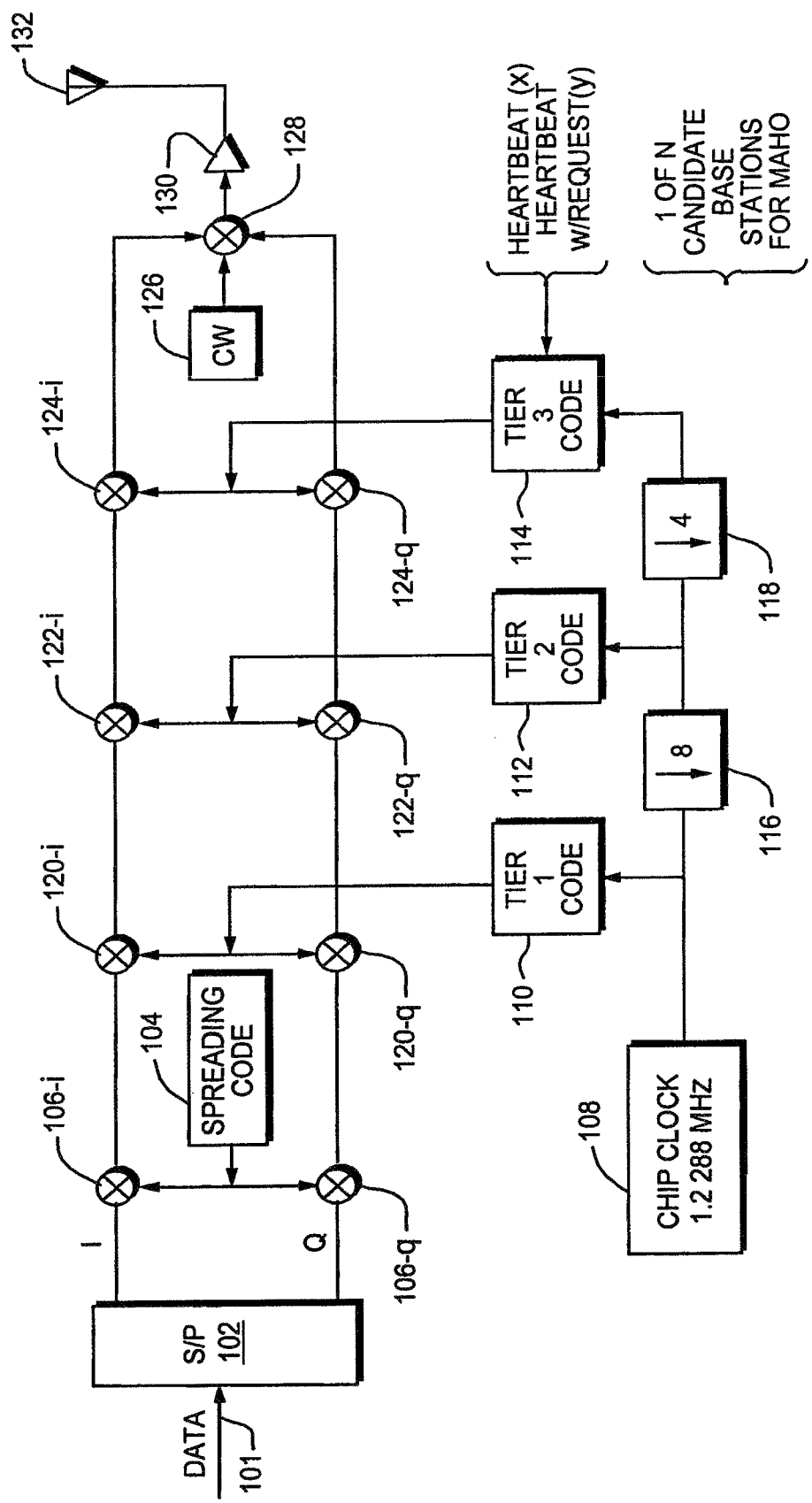
FIG. 5 is a block diagram of channel encoding at a transmitter in the system of FIG. 1.

Turning attention now to FIG. 5, the channel encoding process for transmission of heartbeat and heartbeat with request signals on the heartbeat channel 55H of the reverse link 65 from a transmitter 40 at access unit 42A is described. Specifically, the channel encoding process takes an input data signal 101 that represents information to be transmitted. In the case of a heartbeat or heartbeat with request signal, the data has a value of 1 for the duration of the time slot, i.e., 256 code chips. A serial to parallel converter 102 provides an in-phase (i) and quadrature (q) signal path to a pair of multipliers 106-$i$ and 106-$q$. A spreading code generator 104 provides a spreading code used for spectrum spreading purposes. Typically, the spreading code is a short pseudorandom noise code.

A second code modulation step is applied to the (i) and (q) signal paths by multiplying the two signal paths with a tier 1 code. This is accomplished by the tier 1 code generator 110 and code multipliers 120-1 and 120-$q$.

A third step in the encoding process is to apply a tier 2 code as generated by tier 2 code generator 112. This is accomplished by the multipliers 122-$i$ and 122-$q$ impressing the tier 2 code on each of the in-phase and quadrature signal paths.

In a fourth and final step of the encoding process, a tier 3 code is applied to the (i) and (q) signal paths. This is accomplished by the tier 3 code generator 114 and the code multipliers 124-$i$ and 124-$q$. As noted previously, the tier 3 code (x) for sending the heartbeat signal is selected to be different from the tier 3 (y) code selected for sending the heartbeat with request signal.

The tier 3 encoded in-phase and quadrature signal paths modulate a carrier wave as generated by carrier wave source 126 using an RF modulator 128. The modulated signal is amplified through amplifier 130 and transmitted via antenna 132.

A chip clock 108 provides chip clock timing at the rate of 1.2288 MHz to the tier 1, tier 2, and tier 3 generators 110, 112 and 114. As noted previously, the tier 1 code is at a rate of 8 chips per symbol. The chip clock is divided down by a factor of 8 using divider 116. The tier 2 code generator operates at 32 chips per symbol. The chip clock is divided again by a factor of 4 by divider 118 for the tier 3 generator 114 which provides 128 chips per symbol.

Figure 6:
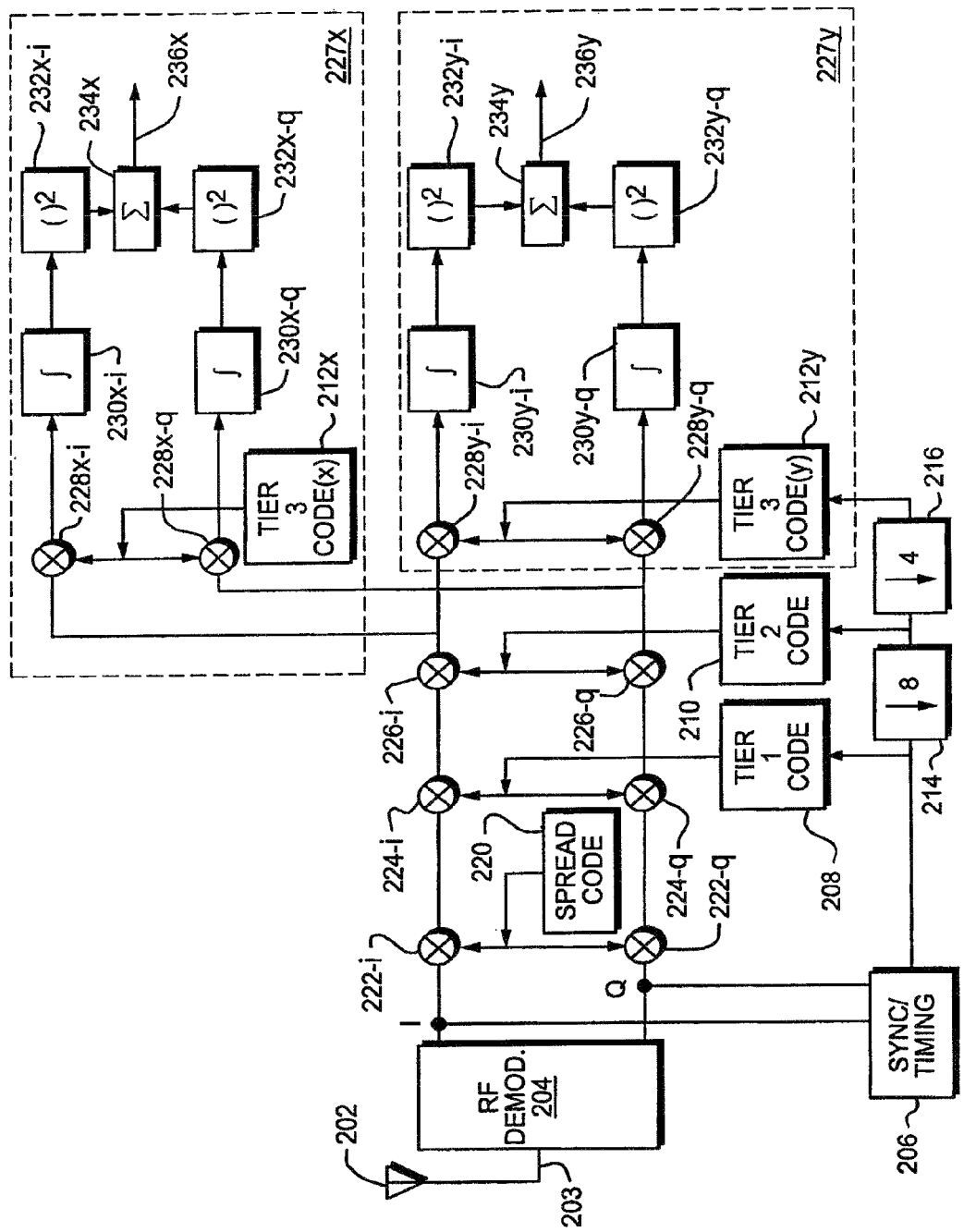
FIG. 6 is a block diagram of channel correlation at a receiver according to the principles of the present invention.

FIG. 6 is a block diagram that illustrates channel correlation at a receiver 35 of base station 25 (FIG. 1) in accordance with principles of the present invention. In general, the correlation process takes advantage of the structure of the tiered or nested codes used to represent coded signals, for example the heartbeat and heartbeat with request signals in the present system. In particular, the correlation process uses the output of a higher rate correlator to feed two or more lower rate correlators, as described further below. Therefore, the higher rate correlator structure can be shared to achieve detection of multiple coded signals.

The channel correlation process includes a number of codes as generated by spreading code generator 220, tier 1 code generator 208 and tier 2 code generator 210. In addition, to detect separate coded signals that are coded at the tier 3 code rate, corresponding separate codes are generated by tier 3 code generators 212$x$ and 212$y$, respectively.

As shown in FIG. 6, a signal 203 received by antenna 202 is fed into RF demodulator 204 where the signal is demultiplexed to provide in-phase (i) and quadrature (q) signal paths to a first pair of multipliers 222-$i$ and 222-$q$. Spreading code generator 220 provides a spreading code used for despreading purposes. This spreading code is the same as the spreading code used in the encoding process with spreading code generator 104 (FIG. 5).

A second step in the correlation process is to apply the tier 1 code as generated by tier 1 code generator 208. This is accomplished by the multipliers 224-$i$ and 224-$q$ impressing the tier 1 code on each of the in-phase and quadrature signal paths.

In a third step of the correlation process, the tier 2 code as generated by the tier 2 code generator 210 is applied to each of the in-phase and quadrature signal paths by multipliers 226-$i$ and 226-$q$.

In the final step of the correlation process, a particular tier 3 code as generated by the respective tier 3 code generators 212$x$ and 212$y$ is applied to each of the in-phase and quadrature signal paths.

As shown in FIG. 6, there are two correlation legs 227$x$ and 227$y$ that share the tier 2 correlation results. In the illustrated embodiment, where 2 possible codes could have been sent (x for heartbeat and y for heartbeat with request), there are two tier 3 correlators. The tier 3 codes are applied by respective multipliers 228$x$-$i$, 228$x$-$q$ and 228$y$-$i$, 228$y$-$q$. Each correlation leg 227$x$ and 227$y$ includes integrators 230$x$-$i$, 230$x$-$q$ and 230$y$-$i$, 230$y$-$q$. In addition, in the in-phase and quadrature signal paths of each leg 227$x$ and 227$y$ are included squarers 232$x$-$i$, 232$x$-$q$ and 232$y$-$i$, 232$y$-$q$. The outputs of the value squarers are summed in summers 234$x$ and 234$y$ respectively to provide final correlation outputs 236$x$ and 236$y$, respectively.

As configured, the integrators 230 integrate over 128 chips. In other embodiments, the integration can be distributed at each tier stage rather than at the final tier 3 stage as shown in FIG. 6.

The correlation in FIG. 6 can be viewed as a series of correlations at the succeeding tiered code rates. That is, the received coded signal is correlated with the higher rate code (tier 2) using a single higher rate correlator (tier 2 code generator 210, multipliers 226-$i$, 226-$q$) to provide a higher rate code correlation result. In a sense, the higher rate code correlation result is a sub-correlation that corresponds to a code element of the lower rate code. The higher rate code correlation results are then fed to two or more lower rate code correlators (correlation legs 227$x$, 227$y$) that combine multiple higher rate code correlation results, each using a different lower rate code (tier 3 code generators 212$x$, 212$y$), to provide corresponding lower rate code correlation results (236$x$, 236$y$). The presence of at least one coded signal can be determined from the lower rate code correlation results. Thus, the dual outputs 236$x$, 236$y$ are generated in part from the same sub-correlations or higher rate code correlation results.

In particular, the presence of one or another of two mutually exclusive coded signals can be determined from the lower rate code correlation results. For example, the lower rate code correlation results 236x, 236y can be compared with each other to determine the presence of either heartbeat (code x was sent) or heartbeat with request (code y was sent) signals.

It should be understood that while two correlation legs 227x and 227y are shown in FIG. 6, it is possible to have multiple such correlation legs to use combinations of correlation results to achieve detection of multiple coded signals. For example, there can be a set of M tier 3 codes with a known subset of N selected codes to be used in communicating coded signals. In that case, the correlator structure can be expanded to have N different correlation legs 227, each one having a different tier 3 code generator 212 corresponding to the N selected codes.

Accordingly, the N lower rate codes can be used in the detection to provide M lower rate code correlation results. That is, in general, the presence of at least one coded signal can be determined from the N lower rate code correlation results. The N lower rate codes can be selected from a set of M possible codes based on a priori system information. The system information can be used to limit the hypothesis outcomes, if any are known, such as the mutual exclusivity of the presence of coded signals.

In one embodiment, the set of M possible codes may represent a set of nearby base stations that are candidates for possible cell handoff of one or more of the code channels and N may represent the subset of the M nearby base stations that are identified as actual active or preferred candidates based on system criteria such as signal strength or signal-to-noise figure.

For example, consider the process of hand over in a cellular communication system, where a mobile access unit is moving from an area serviced by one cell site to another. To avoid disruption of communications (e.g., dropping a call) while the access unit crosses a cell boundary, the timing of handing over control to a new base station must be carefully orchestrated. In a process known as Mobile Assisted Hand Over (MAHO) the mobile access unit performs certain calculations to determine when to communicate to both the current serving base station and a new serving base station that hand over is imminent. For CDMA based systems that employ soft hand-off of the reverse link, this may be transmitted to both base stations simultaneously, but it is not required.

In this process, each access unit maintains a list of candidate base stations in its general vicinity. This can be done, for example, by detecting the presence of forward link paging channels 60P or pilot channels from various base stations 25 in the vicinity (FIG. 1). At any given time, this candidate list will consist of N of M possible base stations in the system 100. The access unit periodically sends the candidate to each base station that it "sees," such as on a reverse link traffic channel 55T. However, precise timing of an actual need for hand over (such as when the paging channel 60P or pilot channel from a currently serving base station is diminishing in power) is critical. Accordingly, the access unit can use the invention by simply sending a short burst with one of N possible tier 3 codes. Thus, because the base station has the candidate list of N preferred base stations available, it can utilize N tier 3 correlators 227 with the N expected codes, and determine which one was sent. In this way, hand over control information can be rapidly and efficiently communicated for selecting service.

The embodiment illustrated in FIG. 6 shows sharing of the output of a higher rate (i.e., tier 2) correlator with two or more lower rate (i.e., tier 3) correlators. It should be understood, however, that in other embodiments the output of the tier 1 correlator can be shared with two or more tier 1 correlators that in turn are shared with two or more tier 3 correlators depending on the types of nested codes used in the wireless communications system.

The correlation process described above with respect to FIG. 6 can be time multiplexed among different access units 42 (FIG. 1) that share the heartbeat channels 55H, thereby allowing a single correlator structure to be shared.

The tier 1, 2, and 3 codes are shown in FIGS. 5 and 6 as operations using Walsh codes. It should be understood that other orthogonal codes such as Gutleber codes could be used as well as M-sequences or pseudo orthogonal codes.

It should also be understood that detection of the received coded signal can be provided independent of the correlation method that is used where there is a priori system knowledge available. In particular, for a code applied to the signal that includes a nested code, the nested code being one of a set of M possible nested codes, detection can be achieved by correlating the received coded signal to provide N nested code correlation results and determining the presence of at least one coded signal from the N nested code correlation results using the system knowledge to limit outcomes. The specific N nested codes can change over time, with information indicating the changes in the current set of codes being communicated between base station and access units to provide a priori system information that is current.

While the specific embodiments described herein relate to operation on a reverse link, it should be understood that the principles of the present invention are also applicable to embodiments that detect coded signals on a forward link.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for use in wireless communications, the method comprising:
   receiving a message in a time slot with a receiver of a mobile wireless device, receiving a coded signal wherein a code applied to the received coded signal includes a lower rate code comprising at least two code sequences of a higher rate code;
   decoding the received message by correlating the received coded signal at the receiver with the higher rate code to provide a higher rate code correlation result, correlating the higher rate code correlation results with a first lower rate code to provide a first lower rate code correlation result, correlating the higher rate code correlation results with a second lower rate code to provide a second lower rate code correlation result, and comparing the first lower rate code correlation result to the second lower rate code correlation result to determine the presence of a signal indication; and
   performing synchronization with an access unit based on the decoded received message.

2. A mobile wireless device comprising:
   a receiver to receive a coded signal, wherein a code applied to the received coded signal includes a lower rate code comprising at least two code sequences of a higher rate code;
   one or more correlators coupled with the receiver to correlate the received coded signal with the higher rate code to provide a higher rate code correlation result, to correlate the higher rate code correlation results with a first lower rate code to provide a first lower rate code correlation result, and to correlate the higher rate code correlation results with a second lower rate code to provide a second lower rate code correlation result; and a comparator coupled with the one or more correlators to compare the first lower rate code correlation result to the second lower rate code correlation result to determine presence of a signal indication.

3. The mobile wireless device of claim 2 wherein the received coded signal is received periodically.

4. The mobile wireless device of claim 2 wherein the lower rate codes are orthogonal to each other.

5. The mobile wireless device of claim 2 wherein the lower rate codes are Walsh codes.

6. The mobile wireless device of claim 2 wherein the lower rate codes are Gutleber codes.

7. The mobile wireless device of claim 2 wherein the lower rate codes are maximum length sequences.

8. The mobile wireless device of claim 2 wherein the lower rate codes are PN-sequences.

9. The mobile wireless device of claim 2 wherein the higher rate code is 32 chips in length and the lower rate codes are 128 chips in length.

10. The mobile wireless device of claim 2 wherein the lower rate codes are used for timing signals.

11. A mobile wireless device comprising:

a receiver to receive a coded signal wherein a code applied to the received coded signal includes a lower rate code comprising at least two code sequences of a higher rate code;

a demodulator coupled with the receiver, the demodulator to demodulate the received coded signal into in-phase and quadrature components;

one or more correlators coupled with the demodulator, the one or more correlators to correlate the in-phase and quadrature components with the higher rate code to provide higher rate code correlation results, to correlate higher rate code correlation results with a first lower rate code to provide a first lower rate code correlation result, and to correlate higher rate code correlation results with a second lower rate code to provide a second lower rate code correlation result;

a comparator coupled with the one or more correlators to compare the first lower rate correlation result to the second lower rate code correlation result to determine the presence of a signal indication.

12. The mobile wireless device of claim 11 wherein the N lower rate codes are selected based on a priori system information.

13. The mobile wireless device of claim 11 wherein the received coded signal is received periodically.

14. The mobile wireless device of claim 11 wherein the lower rate codes are orthogonal to each other.

15. The mobile wireless device of claim 11 wherein the lower rate codes are Walsh codes.

16. The mobile wireless device of claim 11 wherein the lower rate codes are Gutleber codes.

17. The mobile wireless device of claim 11 wherein the lower rate codes are maximum length sequences.

18. The mobile wireless device of claim 11 wherein the lower rate codes are PN-sequences.

19. The mobile wireless device as in claim 11 wherein the lower codes are nested codes comprising at least two code sequences of a base code and N nested lower rate codes are selected from of a set of M possible nested codes.

* * * * *